United States Patent [19]
Yoshiya et al.

[11] Patent Number: 5,969,918
[45] Date of Patent: Oct. 19, 1999

[54] CASSETTE ADAPTOR

[75] Inventors: Hiroshi Yoshiya, Fujiidera; Atsushi Hojo, Nara, both of Japan

[73] Assignee: Matsushita Electric Industrial Co., Ltd., Osaka-fu, Japan

[21] Appl. No.: 08/995,224

[22] Filed: Dec. 19, 1997

[30] Foreign Application Priority Data

Dec. 26, 1996 [JP] Japan ................................. 8-346956

[51] Int. Cl.⁶ ..................................................... G11B 5/10
[52] U.S. Cl. ............................ 360/137; 360/94; 360/128
[58] Field of Search .............................. 360/94, 128, 137

[56] References Cited

U.S. PATENT DOCUMENTS

| | | | |
|---|---|---|---|
| 3,964,099 | 6/1976 | Sato | 360/94 |
| 4,513,335 | 4/1985 | Van Kreuningen | 360/94 |
| 4,734,897 | 3/1988 | Schotz. | |
| 5,280,400 | 1/1994 | Staub | 360/94 |

FOREIGN PATENT DOCUMENTS

| | | |
|---|---|---|
| 3-160683 | 7/1991 | Japan. |
| 4-56391 | 9/1992 | Japan. |

*Primary Examiner*—William J. Klimowicz
*Attorney, Agent, or Firm*—Akin, Gump, Strauss, Hauer & Feld, L.L.P.

[57] ABSTRACT

A cassette adaptor is disclosed, in which a head cover for accommodating the magnetic head is elastically supported on the head spring in such a manner that the height of the recording head and the head gap on the signal transmission side can be automatically adjusted in accordance with the tape running position of the reproduction head of a cassette tape reproduction apparatus and in such a manner that the reels can be positively prevented from being driven under no load. The head cover includes a head guide in contact with a reproduction head and at least a dummy tape member in mesh with the tape guide of the cassette tape reproduction apparatus with the cassette adaptor mounted thereon. The head cover thus guides the magnetic head to a position opposed to the reproduction head.

4 Claims, 14 Drawing Sheets

(a)

(b)

(c)

CASSETTE ADAPTOR

BACKGROUND OF THE INVENTION

The present invention relates to a cassette adaptor for inputting from an external equipment a signal in a recording medium other than a compact cassette tape (hereinafter referred to as "the cassette tape") used for a cassette tape reproduction apparatus mounted on the vehicle or the like.

Among the vehicle-mounted audio equipment, the cassette tape reproduction apparatus is used on many vehicles as an audio equipment as popular as a radio tuner. In recent years, with the extended use of a compact disc (CD), demand for a compact disc reproduction apparatus has increased as a vehicle-mounted sophisticated audio equipment. The compact disc reproduction apparatus, however, has so far been hard to be mounted on an automobile unless included in the standard equipment of the new automobile. Also, the compact disc reproduction apparatus is expensive as compared with the cassette tape reproduction apparatus. For these reasons, the widespread use of the compact disc reproduction apparatus for use on automotive vehicles has been hampered.

Therefore, for listening to a music etc. from a compact disc in a vehicle not equipped with a compact disc reproduction apparatus, a portable compact disc reproduction apparatus has been brought into the vehicle and connected with a cassette tape reproduction apparatus of the vehicle-mounted audio equipment for reproduction. Generally, the vehicle-mounted audio equipment has no input terminal for additional equipment, and therefore a signal output method uses a cassette adaptor as output means of a signal from the compact disc reproduction apparatus to the vehicle-mounted audio equipment. In this signal output method using a cassette adaptor, the output signal from the compact disc reproduction apparatus is input to the cassette adaptor constituting a cassette-type output unit. And this cassette adaptor has been inserted into a cassette tape insertion hole of the cassette tape reproduction apparatus constituting a vehicle-mounted audio equipment. As a result, the output signal of the portable compact disc reproduction apparatus has been input to the vehicle-mounted audio equipment through the cassette adaptor.

The prior art described above includes a method disclosed in a Japanese Patent Publication, Examined Published Patent Application HEI-4-56391.

FIG. 14 is a plan view of the conventional cassette adaptor disclosed in the Japanese Patent Publication, Examined Published Patent Application HEI-4-56391. A housing 112 of a cassette adaptor 110 shown in FIG. 14 has substantially the same shape as a housing (cassette case) of the cassette tape. In an opening 126 in the front (the lower surface in FIG. 14) of this cassette housing 112, 2-channel magnetic heads 140 are provided. A two-wire cable 142 is led out of a notch 146 of the housing 112. An end of this cable 142 is connected to an audio circuit in the housing 112, and the other end of the cable 142 has a plug 144. This plug 144 is configured to be connected to a headphone jack for a compact disc reproduction apparatus not shown. FIG. 15 is an electrical circuit diagram showing an audio circuit disposed in the housing 112.

When listening to a music or the like in the vehicle from the compact disc using the conventional cassette adaptor 110 configured as described above, the plug 144 at the other end of the cable 142 is connected to the headphone jack of the compact disc reproduction apparatus. Next, the cassette adaptor 110 is inserted into the cassette tape insertion hole of the cassette tape reproduction apparatus mounted on the vehicle. The magnetic head 140 of the cassette adaptor 110 mounted in the cassette insertion hole is in opposed relationship to the reproduction head of the cassette reproduction apparatus. Under this condition, assume that the compact disc reproduction apparatus is set in reproduction mode. The output signal of the compact disc reproduction apparatus is input to the audio circuit shown in FIG. 15 through the cable 142, and sent into the magnetic head 140. In view of the fact that the magnetic head 140 is in opposed relationship to the reproduction head of the cassette tape reproduction apparatus, the signal input to the magnetic head 140 leaks and is transmitted to the reproduction head of the cassette tape reproduction apparatus.

In the case of reproducing a compact disc using a conventional cassette adaptor configured as described above, a signal is transmitted most efficiently when the head gap is smallest between the magnetic head of the cassette adaptor for outputting the signal and the reproduction head of the cassette tape reproduction apparatus for receiving the particular signal. In the case where the centers of the two heads are displaced from each other along the tape running direction, however, the signal transmission efficiency is greatly degraded. Also, in the case where the heights of the two head cores of the two heads for determining a transverse position of the track on which the tape runs are coincident with each other, the problems are posed that not only the signal transmission efficiency is reduced but also, for example, the reproduced sound from the left channel crosstalks with the right channel when the magnetic head on the transmission side of the left channel approaches the reproduction head of the right channel.

An ordinary cassette tape reproduction apparatus including a vehicle-mounted cassette tape reproduction apparatus has a rotation detector for detecting the rotational operation of the reels and a tape detector for detecting the presence of a tape. The rotation detector and the tape detector are provided for the purpose of preventing such an accident that a magnetic tape of a mounted cassette tape is kept in active state even when the magnetic tape is broken or a tape has twined around a rotational member, such as a capstan, due to the abnormal tape run and the cassette tape cannot be unloaded. A cassette tape reproduction apparatus having such detectors judges that the tape is broken when the reels stop rotating or the tape is out of position, and thus automatically stops or automatically unloads the cassette tape. In the conventional cassette adaptor, in order to prevent the apparatus from being automatically stopped or the cassette tape from being automatically unloaded in such a situation, various attempts have been made to keep the tape reels in rotation or to brake the tape reels to show that the tape reels are not rotating under no load.

A cassette tape reproduction apparatus including a vehicle-mounted cassette tape reproduction apparatus often employs an auto reverse mechanism. This auto reverse mechanism is so configured that when the tape being reproduced on one track reaches an end and becomes unable to continue to run in the same direction, the tape running direction is reversed to continue the reproduction along the other track. In a cassette tape reproduction apparatus having such an auto reverse mechanism, a 4-track head, for example, is used as a reproduction head, so that the lower two tracks are used for reproduction in one way while the upper two tracks are used for reproduction in the other way.

Another conventional cassette tape reproduction apparatus uses a 2-track head as a reproduction head, in which upon detection of a tape end, the cassette tape reproduction apparatus makes a half rotation to move the head cores to position on a track for reversing. When a cassette adaptor is constructed to correspond to a cassette tape reproduction apparatus having such an auto reverse mechanism, it is necessary to use a 4-track head as the magnetic head of the cassette adaptor or to use a mechanism for reversing a 2-track magnetic head. The use of a 4-track head as the magnetic head of the cassette adaptor, however, poses the problem of an increased cost of the cassette adaptor. On the other hand, provision of a mechanism for reversing the head in the cassette adaptor is virtually impossible. Therefore, most of the conventional cassette adaptors use a magnetic head having a 2-track head core. As a result, when a cassette adaptor is inserted in the conventional cassette tape reproduction apparatus, the track position of the reproduction head sometimes fails to be coincident with the track position of the signal-output magnetic head of the cassette adaptor because of different tape running directions or directions in which the cassette adaptor is mounted. In such a case, the signal cannot be transmitted from the signal-output magnetic head of the cassette adaptor to the reproduction head of the cassette tape reproduction apparatus, and therefore any sound such as a music is not output from the speaker connected to the cassette tape reproduction apparatus. The fact that no sound or the like is heard from the speaker in spite of the cassette tape reproduction apparatus being in reproduction mode often leads to the undesirable judgement that the cassette adaptor is malfunctioning.

An object of the present invention is to solve the problems of the conventional cassette adaptor and to provide a cassette adaptor capable of automatically adjusting the position of the signal-transmission magnetic head in accordance with the tape running position of the reproduction head of the cassette tape reproduction apparatus.

Another object of the present invention is to provide a cassette adaptor comprising means for preventing the reels thereof from rotating under no load and capable of rotating the reels with reliability.

Still another object of the present invention is to provide a cassette adaptor used for a cassette tape reproduction apparatus comprising an auto reverse mechanism, in the case where a track for the magnetic head of the cassette adaptor is positioned is different from a track for the reproduction head of the cassette tape reproduction apparatus, the tape running direction is reversed so that the magnetic head of the cassette adaptor is positioned on the same track as the reproduction head.

SUMMARY OF THE INVENTION

In order to achieve the above-mentioned objects, a cassette adaptor of the present invention comprises:
  a housing having such a shape as to be mountable interchangeably with the cassette tape reproduced in a cassette tape reproduction apparatus;
  a signal output magnetic head built in the housing and arranged in opposed relationship to the reproduction head for reproducing the cassette tape of the cassette tape reproduction apparatus thereby to transmit a signal to the reproduction head; and
  a head cover for accommodating and holding the magnetic head in a predetermined positional relationship with the housing, the head cover having at least a dummy tape member adapted to engage the tape guide of the cassette tape reproduction apparatus for guiding the magnetic head to a position in opposed relationship with the reproduction head.

With the cassette adaptor according to this aspect of the present invention configured as described above, when the cassette tape is mounted in the cassette tape reproduction apparatus, the dummy tape member is guided by the tape guide of the cassette tape reproduction apparatus and the signal output magnetic head is arranged in position along the tape width with respect to the reproduction head of the cassette tape reproduction apparatus.

A cassette adaptor of another aspect of the invention further comprises a head spring for elastically supporting the head cover with respect to the housing, urging the magnetic head in such a direction as to contact the reproduction head inserted in the housing, and urging the head cover in such a manner that the dummy tape member comes into contact with a reference surface of the tape guide of the cassette tape reproduction apparatus.

When the cassette adaptor of the present invention configured as described above is mounted in the cassette tape reproduction apparatus, the magnetic head moves in accordance with the position of the reproduction head so that the signal-output magnetic head is set in position to the reference surface of the tape guide.

A cassette adaptor of another aspect of the present invention further comprises a head guide formed on the head cover at a position in opposed relationship to the reproduction head of the cassette tape reproduction apparatus and adapted to come in contact with the reproduction head inserted in the housing for guiding the magnetic head into position.

With the cassette adaptor of the present invention configured as described above, the signal-output magnetic head is arranged in position along the tape running direction with respect to the reproduction head of the cassette tape reproduction apparatus.

In a cassette adaptor of another aspect of the present invention, the head cover includes at least a rib formed at a position in opposed relationship to the reproduction head of the cassette tape reproduction apparatus and adapted to come in contact with the magnetic head thereby to place the magnetic head in position when the magnetic head is built in the head cover.

With the cassette adaptor of the present invention configured as described above, the magnetic head can be easily built in the head cover and the position of the magnetic head relative to the reproduction head can be adjusted with high accuracy.

A cassette adaptor of another aspect of the present invention comprises:
  a housing having such a shape as to be mountable interchangeably with the cassette tape to be reproduced in a cassette tape reproduction apparatus and having at least an opening into which the capstan and the pinch roller of the cassette tape reproduction apparatus are inserted;
  a signal output magnetic head built in the housing and arranged in opposed relationship to the reproduction head of the cassette tape reproduction apparatus for reproducing the cassette tape, the signal output magnetic head transmitting a signal to the reproduction head;
  at least a reel having a reel hub driven by a reel drive mechanism of the cassette tape reproduction apparatus; and
  an endless pseudo tape suspended on the reel with a predetermined tension through the opening of the housing into which the capstan and the pinch roller are inserted, the pseudo tape being driven at a substantially constant speed by the capstan and the pinch roller.

With the cassette adaptor of the present invention configured as described above, the endless pseudo tape is driven at a substantially constant speed by the capstan and the pinch roller of the cassette reproduction apparatus so that the reel on which the pseudo tape is suspended rotates without any sliding. As a result, the cassette tape reproduction apparatus having the cassette adaptor according to the invention mounted therein is free of an erroneous judgement that the tape has broken and also free of the faulty operation of automatically stopping or automatically unloading the cassette adaptor.

A cassette adaptor of yet another aspect of the present invention further comprises a head cover for accommodating and holding the magnetic head in a predetermined positional relationship with the housing and having at least a dummy tape member adapted to engage the tape guide of the cassette tape reproduction apparatus for guiding the magnetic head to a position in opposed relationship with the reproduction head.

With the cassette adaptor of the present invention configured as described above, when the cassette adaptor is mounted in the cassette tape reproduction apparatus, the dummy tape member of the cassette adaptor is guided by being inserted into the tape guide of the cassette tape reproduction apparatus. Consequently, the signal output magnetic head is arranged in position along the tape width relative to the reproduction head of the cassette tape reproduction apparatus.

In a cassette adaptor of another aspect of the present invention, the housing is formed to have two openings into which a capstan and a pinch roller of the cassette tape reproduction apparatus are inserted, and the pseudo tape is driven by being held in one of the openings.

With the cassette adaptor of the present invention configured as described above, the pseudo tape is driven at a substantially constant speed by the capstan and the pinch roller of the cassette reproduction apparatus.

A cassette adaptor of another aspect of the present invention further comprises a member of high friction coefficient arranged on the outer peripheral portion of the reel in contact with the pseudo tape for driving the pseudo tape without sliding.

In a cassette adaptor of another aspect of the present invention, a plurality of protrusions are formed equidistantly along the peripheral portion of the reel in contact with the pseudo tape, a perforation having holes is formed in the pseudo tape at positions corresponding to the protrusions, the protrusions are adapted to engage the perforation, and the reel is driven by the movement of the pseudo tape.

A cassette adaptor of another aspect of the present invention further comprises tensioning means having the pseudo tape suspended thereon, in which the pseudo tape is kept in suspension between two reels with a substantially constant tension.

With the cassette adaptor of the present invention configured as described above, the pseudo tape rotates the reels without sliding.

A cassette adaptor of another aspect of the present invention further comprises an intermediate reel having teeth in mesh with the teeth formed on an outer periphery of two reels for causing reels to rotate in interlocked relationship with each other.

With the cassette adaptor of the present invention configured as described above, the two reels are driven in interlocked relationship with each other and are not driven under no load.

In a cassette adaptor of another aspect of the present invention, a pseudo tape is suspended on two reels and an intermediate reel, and a gear ratio between the two reels and the intermediate reel is set in such a manner that the peripheral speeds of the tape on the contact surfaces of the two reels and the intermediate reels are coincident with each other.

With the cassette adaptor of the present invention configured as described above, the two reels and the intermediate reel on which the pseudo tape is suspended rotate without sliding.

A cassette adaptor of another aspect of the present invention comprises:

a housing having such a shape as to be capable of being interchangeably mounted with the cassette reproduced in a cassette tape reproduction apparatus;

a signal output magnetic head built in the housing and arranged in opposed relationship to the reproduction head for reproducing the cassette tape of the cassette tape reproduction apparatus, the magnetic head transmitting a signal to the reproduction head;

two reels formed with teeth on the outer periphery thereof and having a reel hub driven by a reel drive mechanism of the cassette tape reproduction apparatus; and reverse rotation stopper means for defining the rotation of the reels in one direction, allowing the reels to rotate when the magnetic head is at such a position as to be capable of transmitting a signal to the reproduction head, and prohibiting the rotation of the reels when the magnetic head is at such a position as to be incapable of transmitting a signal to the reproduction head.

With the cassette adaptor of the present invention configured as described above, in the case where the cassette adaptor is mounted in a cassette reproduction apparatus having an auto reverse mechanism and when the signal output magnetic head is at a position incapable of transmitting a signal to the reproduction head of the cassette tape reproduction apparatus, the rotation of the reels of the cassette adaptor is automatically prohibited to reverse the tape running direction and the signal output magnetic head is arranged at a position capable of transmitting a signal to the reproduction head of the cassette tape reproduction apparatus.

In a cassette adaptor of another aspect of the present invention, stopper means for preventing reverse rotation comprises: an intermediate reel having teeth in mesh with the teeth formed on the outer periphery of the two reels and adapted to drive the two reels in interlocked relationship with each other;

a stopper member pressure-fitted on the hub of the intermediate reel in such a manner as to slide in response to a force of not less than a predetermined rotational torque applied to the hub of the intermediate reel; and a stopper for defining one end of the movable range of the stopper member;

wherein when the stopper member rotates together with the intermediate reel in the movable range and comes into contact with the stopper making up an end of the movable range, the stopper means slides on the hub of the intermediate reel and allows the intermediate reel to rotate, and wherein the stopper member engages the teeth of the reels constituting the other end of the movable range thereby to inhibit the rotation of the reels.

With the cassette adaptor of the present invention described above, when the adaptor is mounted in a cassette tape reproduction apparatus having an auto reverse mechanism and in the case where the position of the reproduction head on the track fails to coincide with the position of the magnetic head on the track, the cassette adaptor according to the invention inhibits the reel rotation in the cassette tape reproduction apparatus and reverses the tape running direction thereby to arrange the reproduction head automatically at a position capable of transmitting a signal from the magnetic head.

In a cassette adaptor of another aspect of the present invention, the housing includes at least an opening into which the capstan and the pinch roller of the cassette tape reproduction apparatus are inserted, and wherein an endless pseudo tape is suspended on the reels with a predetermined tension through the opening of the housing having the capstan and the pinch roller inserted therein, the pseudo tape being driven at a substantially constant speed by the capstan and the pinch roller.

With the cassette adaptor of the present invention configured as described above, the endless pseudo tape is driven at a substantially constant speed by the capstan and the pinch roller of the cassette reproduction apparatus. The rotational operation of the reels is allowed in the case where the direction in which the endless pseudo tape is driven is associated with the relative positions of the two heads capable of transmitting a signal from the magnetic head to the reproduction head of the cassette tape reproduction apparatus.

Thus, since the pseudo tape is driven at a substantially constant speed, the reels driven interlocked without sliding with the pseudo tape are not driven under no load. Consequently, the cassette tape reproduction apparatus having the cassette adaptor mounted therein is not adapted to automatically stop or automatically unload the cassette adaptor by judging that the cassette tape has broken.

The novel features of the invention are described specifically in the claims attached hereto. The configuration and substance of the present invention, together with other objects and features thereof, will be understood and evaluated better from the following detailed description in conjunction with the drawings.

It should be noted that part or the whole of the drawings are drawn in a schematic representation intended for illustration and does not necessarily faithfully plot the actual relative sizes and positions of the component elements shown.

DESCRIPTION OF THE PREFERRED EMBODIMENTS

Preferred embodiments of a cassette adaptor according to the present invention will be described below with reference to the accompanying drawings.

<<First embodiment>>

Figure 1:
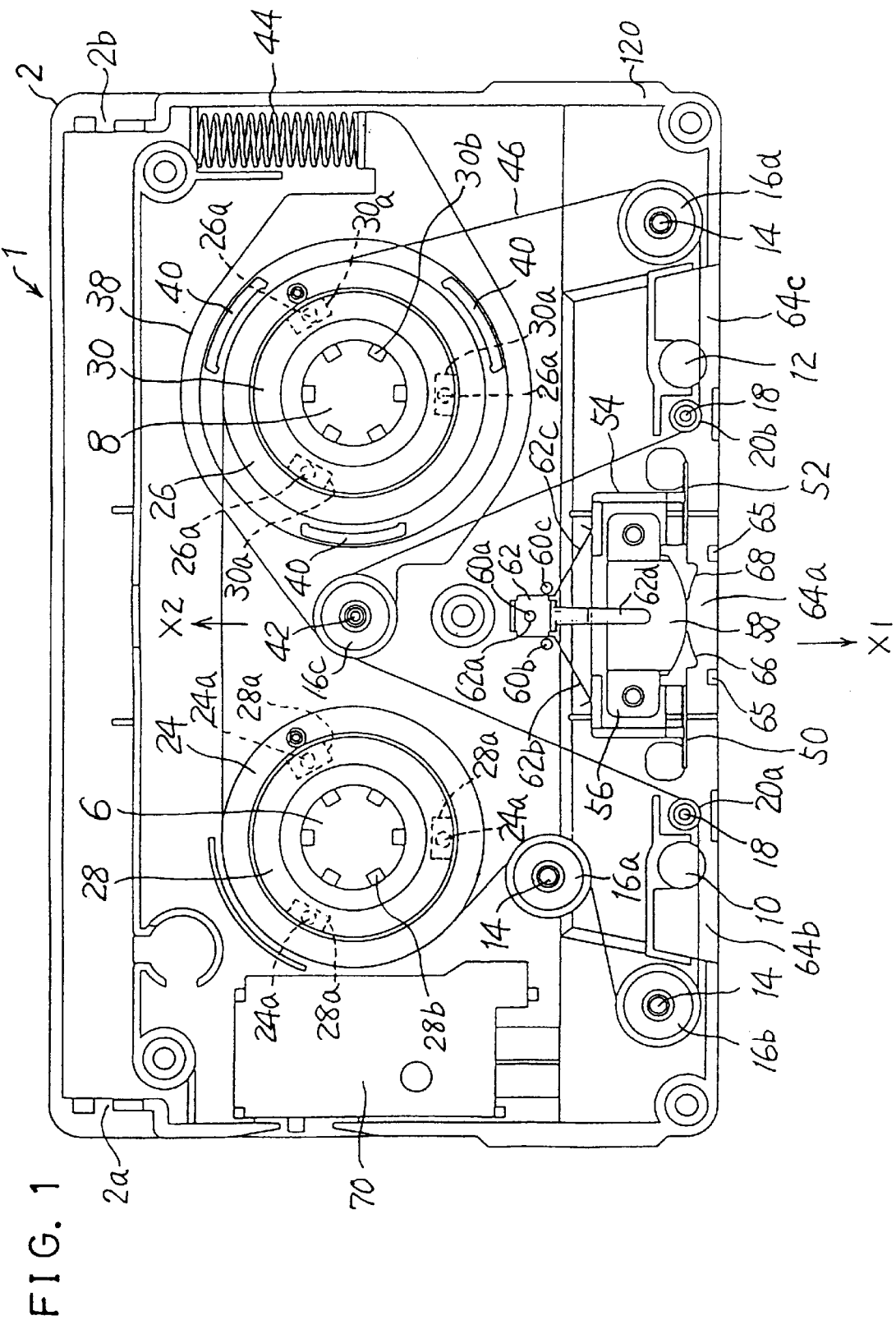
FIG. 1 is a plan view showing an internal structure of a housing of a cassette adaptor according to a first embodiment of the present invention.
Figure 2:
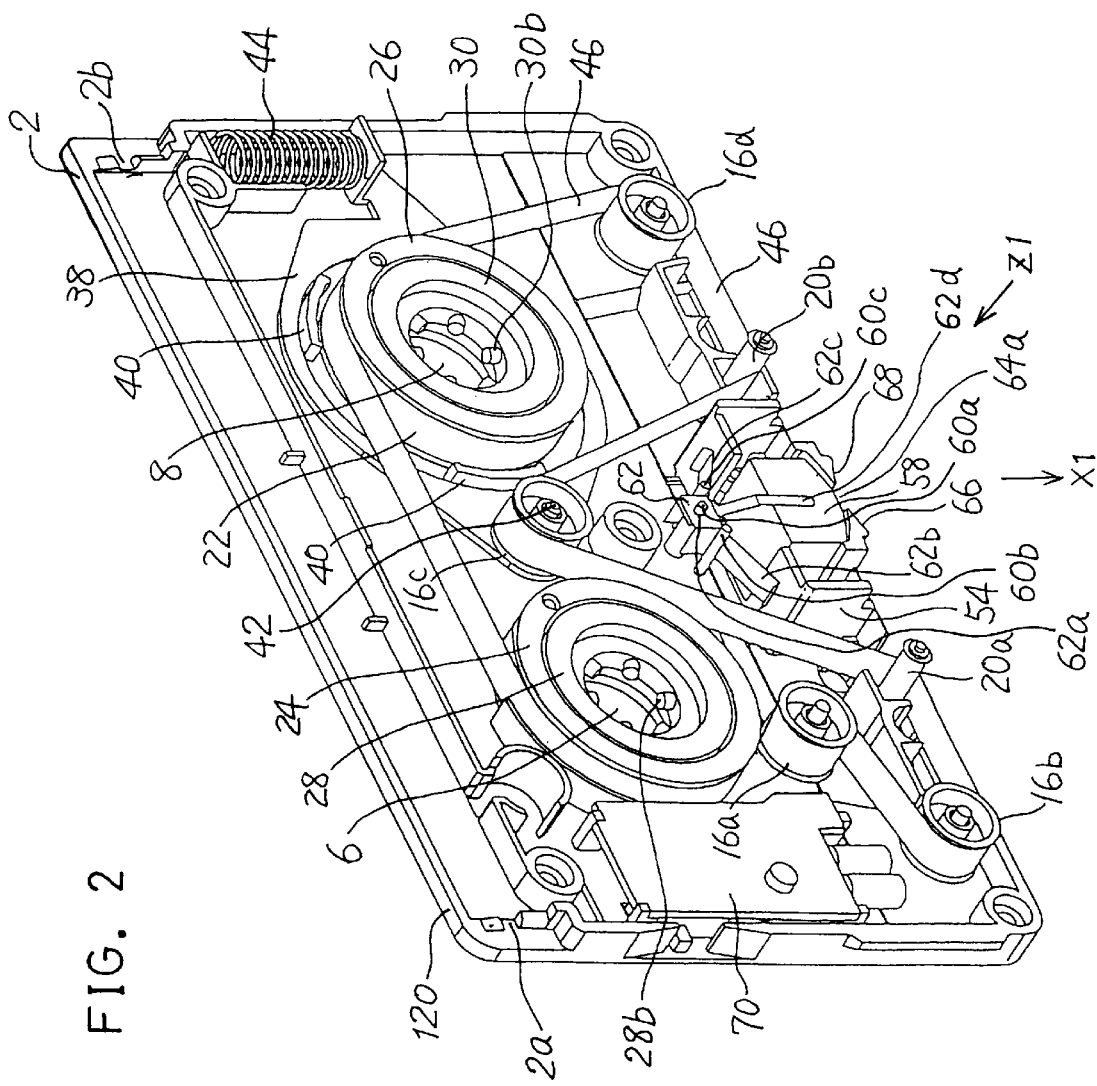
FIG. 2 is a perspective view showing an internal structure of the housing of the cassette adaptor according to the first embodiment.
Figure 3:
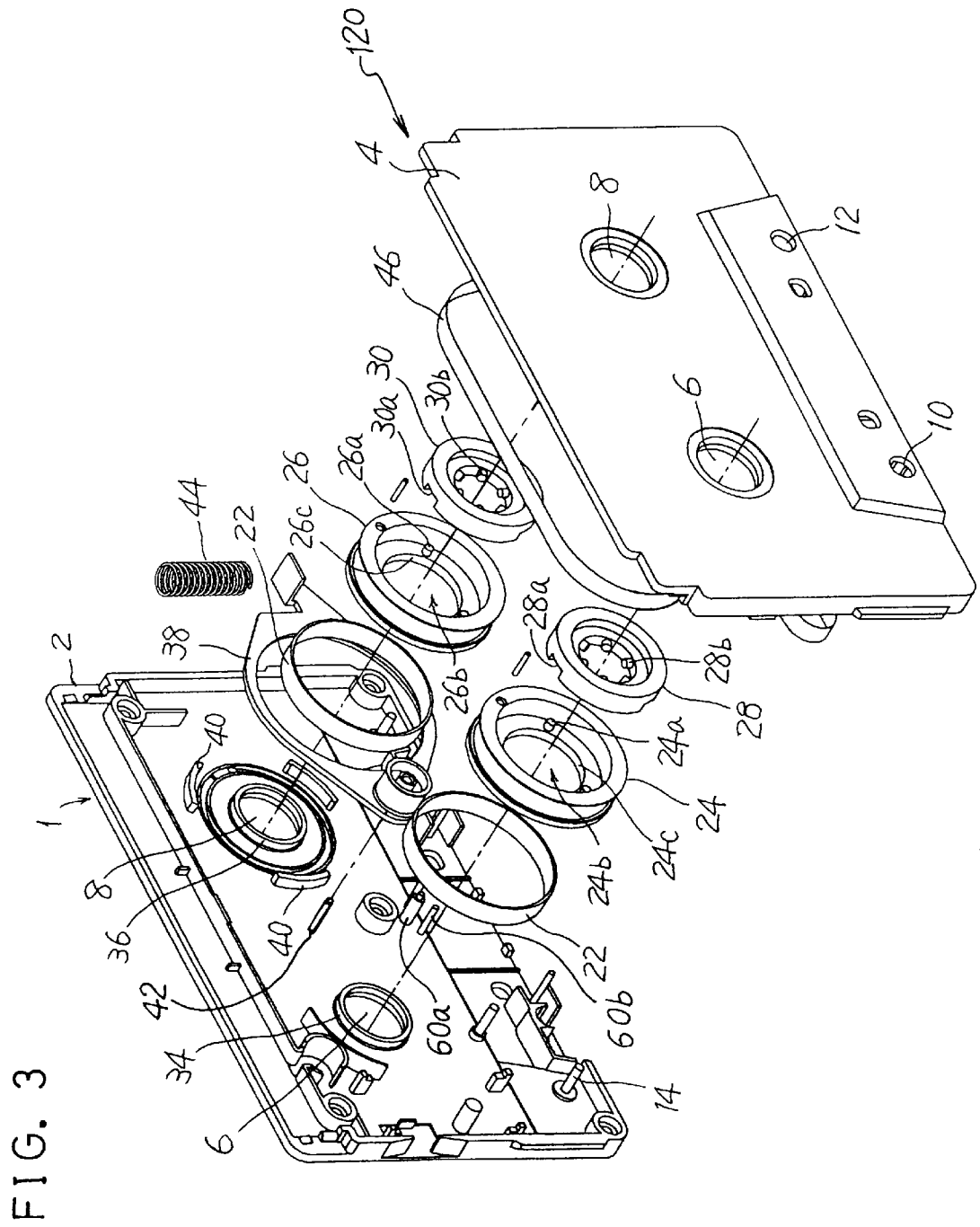
FIG. 3 is an exploded perspective view showing a structure of the cassette adaptor according to the first embodiment.

FIG. 1 is a plan view showing an internal structure of a back case of a cassette adaptor, of which a front case is removed, according to a first embodiment of the present invention. FIG. 2 is a perspective view showing the internal structure of the back case of the cassette adaptor according to the first embodiment similar to FIG. 1. FIG. 3 is an exploded perspective view of the cassette adaptor according to the first embodiment.

[Structure of cassette adaptor]

A housing 120 of a cassette adaptor according to the first embodiment is formed by coupling the back case 2 and the front case 4 to each other. The back case 2 and the front case 4 have holes 6, 8 for two left and right reel shafts, holes 10, 12 each for inserting a capstan, etc, and has the same shape as an ordinary cassette tape.

As shown in FIG. 1, the back case 2 and the front case 4 coupled to each other have three pins 14 erected thereon for pivotally supporting three tape rollers 16a, 16b, 16d, respectively. Also, two pins 18 are erected on the two sides of a magnetic head 58 for pivotally supporting tape rollers 20a, 20b, respectively.

As shown in FIGS. 2 and 3, two hollow reels 24, 26 arranged on the left and right sides in the housing 120 have mounted on the outer periphery thereof an anti-slide reel rubber 22 formed of chloroprene rubber, silicon rubber or the like. Three protrusions 24a, 26a (see FIG. 3) protruded in parallel to the reel rotational shafts are formed in the reels 24, 26, respectively. These protrusions 24a, 26a are configured to engage reel hubs 28, 30, respectively, mounted inside of the reels 24, 26.

A small gap is formed between the outer peripheral surfaces of the reel hubs 28, 30 mounted inside of the reels 24, 26 and the inner surfaces of the reels 24, 26. Three notches 28a, 30a are formed in the outer peripheral surfaces of the reel hubs 28, 30 at positions corresponding to the protrusions 24a, 26a to be inserted.

In order to transmit the driving force smoothly to the reels 24, 26 from the reel shafts (not shown) of the cassette tape reproduction apparatus having the cassette adaptor 1 mounted therein, six protrusions 28b, 30b are formed on the inner peripheral surfaces of the reel hubs 28, 30 mounted inside the internal spaces 24b, 26b of the reels 24, 26, respectively. The protrusions 28b, 30b formed on the inner peripheral surfaces of the reel hubs 28, 30 have a slight play in the direction of the rotational axes and in the radial direction of the reels 24, 26, and are formed in such a manner as to smoothly transmit the driving force to the reels 24, 26 from the reel shafts of the cassette tape reproduction apparatus.

The reels 24, 26 with the reel hubs 28, 30 mounted thereon are rotatably supported by the engagement between the outer peripheral surfaces of the ribs 34, 36 formed around the holes 6, 8 of the back case 2 and the inner peripheral surfaces 24c, 26c of the reels 24, 26.

As shown in FIG. 3, a tension lever arranged on the outer periphery of the right reel 26 is rotatably supported on three ribs 40 formed on the back case 2. Also, the tension lever 38 has the roller 16c at the left end thereof pivotally supported by a pin 42 erected between the left reel 24 and the right reel 26. A tension spring 44 is disposed on the right side of the tension lever 38. The tension lever 38 is urged by the tension spring 44 to rotate clockwise.

An endless pseudo tape is suspended on the reels 24, 26 and the rollers 16a, 16b, 16c, 20a inside of the housing 120 configured as described above.

The pseudo tape 46 is an endless tape formed of such a material as polyethylene terephthalate 40 to 80 microns in thickness and has the same width as an ordinary cassette tape. As shown in FIG. 2, the pseudo tape 46 is so suspended that, after being wound counterclockwise on the outer periphery of the left reel 24, it is wound clockwise on the roller 16a, counterclockwise on the rollers 16b, 20a, clockwise on the roller 16c, counterclockwise on the outer periphery of the rollers 20b, 16d and the right reel 26, and then returns to the outer periphery of the left reel 24.

The roller 16c at the left end of the tension lever 38 is pushed upward (in the direction X2 in FIG. 1) by the force of the tension spring 44. The pseudo tape 46 suspended on the roller 16c, therefore, is subjected to a predetermined tension.

As shown in FIG. 1, the pseudo tape 46, like the magnetic tape of an ordinary cassette tape, is arranged in such a manner as to pass through holes 10, 12 for insertion of the capstans and openings 64b, 64c for insertion of the pinch rollers. As a result, the pseudo tape 46 is held between the pinch rollers and the capstans of the cassette tape reproduction apparatus with the cassette adaptor 1 mounted thereon, and is configured to be fed out rightward in FIG. 1 at a substantially constant speed with the drive of the capstans. Explanation will be made later in detail about the operation performed when the cassette adaptor 1 is mounted in the cassette tape reproduction apparatus.

Figure 4:
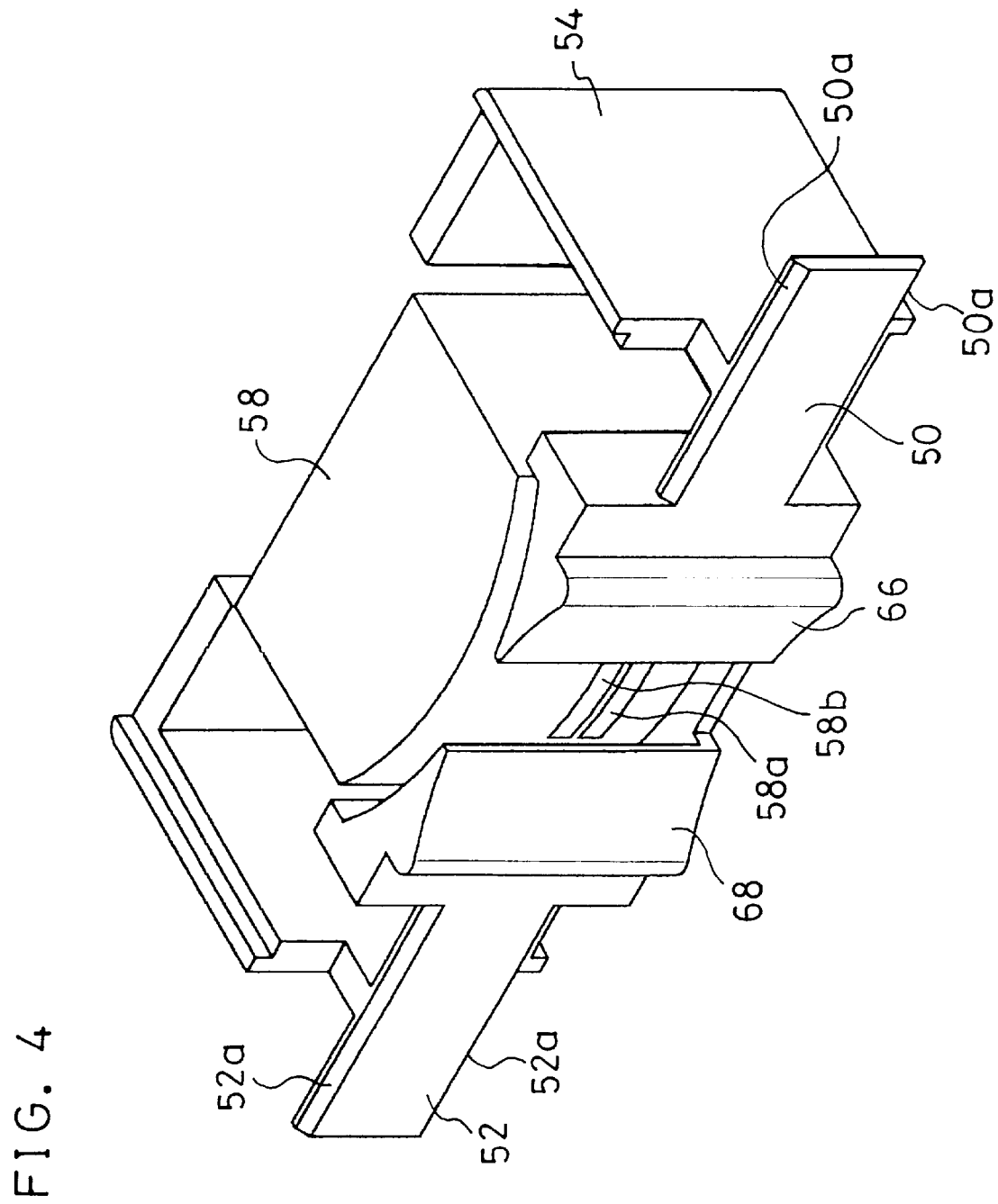
FIG. 4 is a perspective view showing a head cover having a magnetic head of the cassette adaptor according to the first embodiment.
Figure 5:
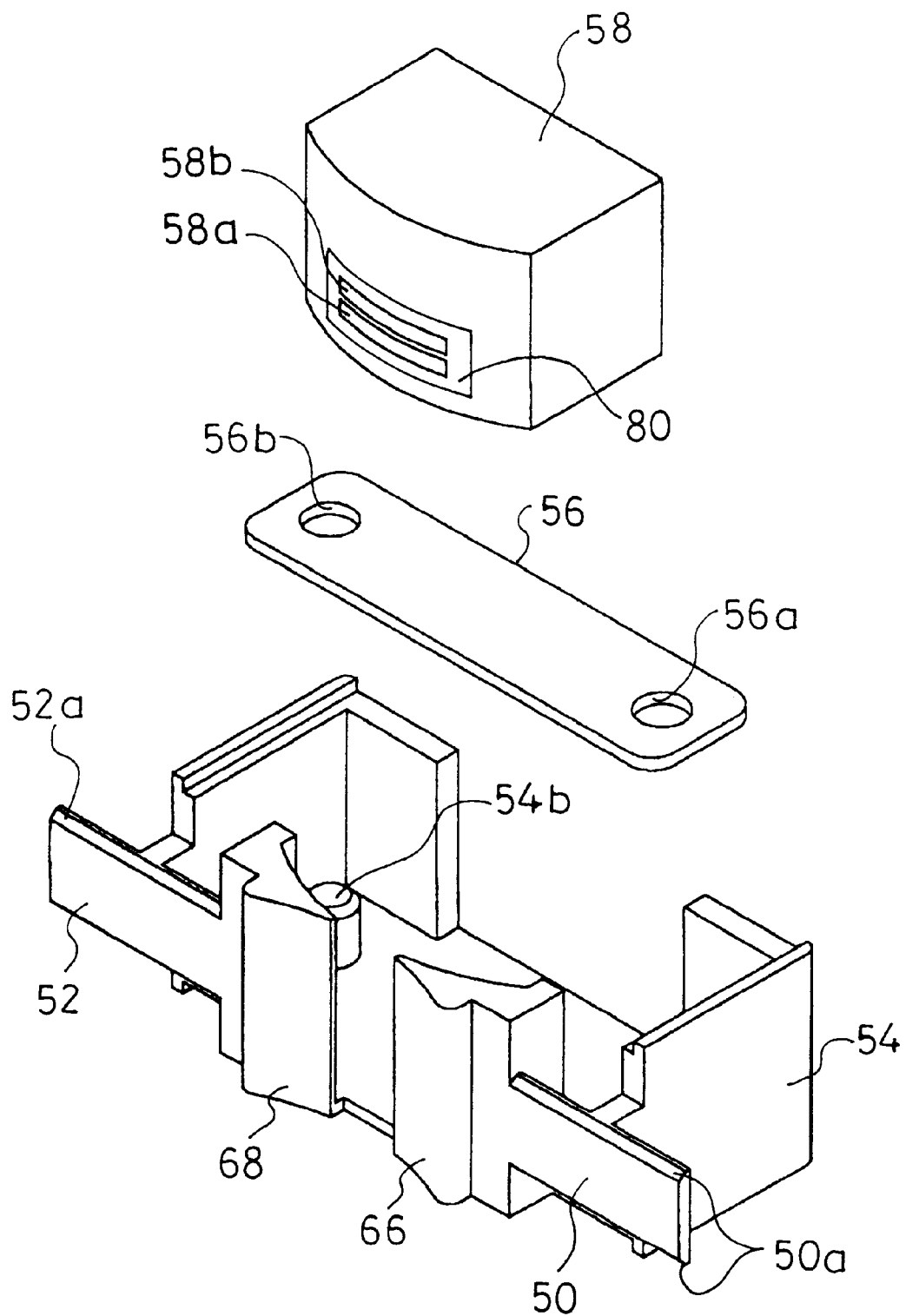
FIG. 5 is an exploded perspective view showing the head cover having the magnetic head of the cassette adaptor according to the first embodiment.

FIG. 4 is a perspective view showing a configuration of a head cover 54 for holding the magnetic head 58 in the cassette adaptor 1 according to the first embodiment. The head cover 54 is arranged on the front side (the lower side in FIG. 1) of the back case 2. Dummy tape members 50, 52 having a fixed length are integrally formed at the ends of the head cover 54. The head cover 54 has the magnetic head 58 fixed therein through a pedestal plate 56 (FIG. 5). The magnetic head 58 is fixed on a position that the head cores 58a, 58b of the magnetic head 58 are arranged on each extension of the dummy tape members 50, 52 formed at the ends of the head cover 54. In other words, the relative positions of the dummy tape members 50, 52 and the magnetic head 58 are substantially the same as those of the magnetic tape and the magnetic head of the ordinary cassette tape.

According to the first embodiment, the shape of the dummy tape members 50, 52 is determined within a tolerable size in conformance with the standards of the magnetic tape of the ordinary cassette tape used for the cassette tape reproduction apparatus. Consequently, when the cassette adaptor 1 is mounted in the cassette tape reproduction apparatus, the fact that the dummy tape members 50, 52 are formed in conformance with the standards of the magnetic tape makes it possible to hold the dummy tape members 50, 52 securely with the tape guide. Also, in view of the fact that tapered portions 50a, 52a are formed at the upper and lower end surfaces of the dummy tape members 50, 52, the dummy tape members 50, 52 have a shape easy to insert into the tape guide of the cassette tape reproduction apparatus.

As shown in FIG. 4, two inwardly curved head guides 66, 68 are formed on the front surface of the head cover 54. The surface of each of the head guides 66, 68 is opposed to the reproduction head, and is formed with an appropriate radius of curvature. An opening is formed between the two head guides 66, 68. In this opening, head cores 58a, 58b of the front central portion of the magnetic head 58 are arranged. The magnetic head 58 is arranged in such a manner that the head cores 58a, 58b are located on the extension of the dummy tape members 50, 52.

The radius of curvature of the curved surface formed on each of the head guides 66, 68 in opposed relation to the reproduction head is set slightly larger than the radius of curvature of the front side of the reproduction head of the cassette tape reproduction apparatus into which the cassette adaptor 1 is inserted. When the curved surfaces thereof come into contact with the reproduction head, the head guides 66, 68 are adapted to guide the magnetic head 58 in such a manner that the center line of the magnetic head 58 is coincident with the center line of the reproduction head. In this way, the head guides 66, 68 are provided in order to minimize the head gap between the magnetic head 58 and the reproduction head.

The radius of curvature of the reproduction head of the cassette tape reproduction apparatus is appropriately set and varied from one equipment model or commodity to another. Therefore, the radius of curvature of the curved surface formed on the front side of each of the head guides 66, 68 according to the first embodiment is set in a way to accommodate an expected maximum radius of curvature. Due to this configuration, the magnetic head 58 of the cassette adaptor 1 is set accurately in opposed relationship to the reproduction head with not more than a predetermined head gap.

The magnetic head 58 according to the first embodiment has the same track structure as the reproduction head of the cassette tape reproduction apparatus in which the cassette adaptor 1 is to be mounted.

Explanation will be made about a method of fixing the magnetic head 58 on the head cover 54.

FIG. 5 is an exploded perspective view showing the magnetic head 5 and the head cover 54 of the cassette adaptor 1 according to the first embodiment.

In FIG. 5, assume that the magnetic head 58 is housed in a metal shield case. First, the magnetic head 58 is mounted by spot welding at a predetermined position on the pedestal plate 56 of a metal material. After this spot welding, the height of the head cores 58a, 58b of the magnetic head 58 from the bottom surface of the shield case is measured. This height is adjusted by bending the ends of the pedestal plate 56 until the head cores 58a, 58b are set in position as specified when the magnetic head 58 is encased in the head cover 54.

Next, the pedestal plate 56 is inserted into the head cover 54, and the holes 56a, 56b of the pedestal plate 56 are pressed and fixed over the taper pins 54a, 54b erected on the head cover 54. In this way, the pedestal plate 56 is fixed at a predetermined internal position of the cover 54 so that the magnetic head 58 is fixed within the head cover 54.

Thus, the position of the magnetic head 58 fixed in the head cover 54 is set in such a manner that the head cores 58a, 58b would be located at a predetermined position along the width and the running direction of the magnetic tape and the head cores 58a, 58b would be in predetermined spaced relationship with the magnetic tape in an assumed case that the magnetic tape exists in place of the dummy tape members 50, 52 of the head cover 54.

The method of fixing the magnetic head 58 is not limited to the above-mentioned method. Instead of forming the taper pins 54a, 54b on the head cover 54 as described above, for example, a curved spring plate can be arranged under the pedestal plate 56 with the magnetic head 58 fixed thereon, and the pedestal plate 56 can be fixedly fastened to the bottom plate of the head cover 54 with screws through the holes 56a, 56b of the pedestal plate 56. In this case, the height of the magnetic head 58 is changed according to the degree of fastening the screws, thereby adjusting the height of the head cores 58a, 58b of the magnetic head 58 with respect to the dummy tape members 50, 52. After this adjustment, the screws are coated with a fixing agent.

As still another method of fixing the magnetic head 58, a spacer of the desired thickness is selected from a plurality of spacers of different thicknesses. This spacer is held between the pedestal plate 56 with the magnetic head 58 fixed thereon and the head cover 54 thereby to fix the magnetic head 58 on the head cover 54.

As described above, in fixing the magnetic head 58 and the head cover 54 to each other according to the first embodiment, the head cores 58a, 58b are arranged at a position within the tape width on the extension of the dummy tape members 50, 52 assumed to be a magnetic tape when the magnetic head 58 is mounted on the head cover 54, and the head gap between the magnetic head 58 and the reproduction head has not more than a predetermined length conforming to the standards.

A protective sheet 80 for protecting the head cores 58a, 58b is attached on the front surface of the magnetic head 58 according to the first embodiment in order that the head cores 58a, 58b may not be damaged when coming in contact with the reproduction head.

The head cover 54 formed in the above-described manner is held movably to some extent in four directions by a head spring 62 (FIG. 2) within the housing 120. The back case 2 has three pins 60a, 60b, 60c erected thereon. The hole 62a formed in the head spring 62 is held by the central pin 60a applied through the hole 62a. Also, the left and right pins 60b, 60c support the left and right side surfaces of the head spring 62, respectively, thereby regulating the lateral movement of the head spring 62.

The head spring 62 includes three spring members 62b, 62c, 62d for holding the head cover 54. As shown in FIG. 2, the rear surface of the head cover 54 is in contact with the forward end of the two spring members 62b, 62c of the head spring 62, thereby pressing the head cover 54 toward the front side (downward in FIG. 1). Specifically, the spring members 62b, 62c of the head spring 62 urge the head cover 54 toward the opening 64a (in the direction of arrow X1 in FIG. 1) in the front surface of the housing 120. The head cover 54 thus urged in this way is prevented from jumping out by the protrusions 65 formed on the front side of the back case 2. Also, the spring member 62d of the head spring 62, which is in contact with the upper surface of the head cover 54, urges the head cover 54 along the direction of arrow Z1 in FIG. 2 in such a manner as to press it against the back case 2.

The head cover 54 having the magnetic head 58 as described above is held elastically and movably by the three spring members 62b, 62c, 62d of the head spring 62.

The head cover 54 having the magnetic head 58 built therein as described above is mounted, together with the other component parts, on the back case 2 and is covered with the front case 4. The cassette adaptor 1 according to the first embodiment is assembled with the internal parts held between the front case 4 and the back case 2 and by being fixed with screws or the like not shown. The cassette adaptor 1 assembled in this way has the dummy tape members 50, 52 of the head cover 54, which are arranged at a position where the magnetic tape in the ordinary cassette tape should run.

An electrical circuit board 70 in the cassette adaptor 1 shown in FIGS. 1 and 2 includes an audio circuit for supplying the magnetic head 58 with a signal input from external equipment such as a compact disc reproduction apparatus or the like. Also, the electrical circuit board 70 is connected to a cable (not shown) having a plug at the forward end thereof in the same manner as in the aforementioned prior art. This cable is configured in such a manner as to be led out from a left cable outlet 2a or a right cable outlet 2b of the back case 2 shown in FIG. 1. The two cable outlets 2a, 2b are prepared in order to meet the different cases in which a cassette tape reproduction apparatus is constructed to be inserted by a cassette tape in a different direction into the cassette tape insertion hole thereof.

The plug provided at the forward end of the cable is connected to an output jack (for example, a headphone jack) of the compact disc reproduction apparatus or the like equipment for supplying a signal to the cassette adaptor 1. The signal from the compact disc reproduction apparatus is applied to the audio circuit and output to the above-mentioned magnetic head 58.

[Operation of cassette adaptor]

Now, explanation will be made about the operation of the cassette adaptor 1 according to the first embodiment configured as described above. The description of the operation that follows concerns the operation in the case that the cassette adaptor 1 according to the first embodiment is mounted in place of a cassette tape in the cassette tape reproduction apparatus having a reproduction head.

In the case that the cassette adaptor 1 according to the first embodiment shown in FIG. 1 is mounted in the cassette tape reproduction apparatus, the reel shafts (not shown) of the cassette tape reproduction apparatus are inserted into the reel shaft holes 6, 8 of the housing 120 configured of the front case 2 and the back case 4. These reel shafts engage six protrusions back case 4. These reel shafts engage six protrusions 28b, 30b formed on the internal peripheral surface of the reel hubs 28, 30 thereby driving the reel hubs 28, 30 rotationally. At the same time as the rotational driving operation described above, the capstan (not shown) of the cassette tape reproduction apparatus, which is inserted in the capstan insertion hole 12 of the housing 120, is brought into contact with a pinch roller (not shown) inserted from the front opening 64c of the housing 120 with the pseudo tape 46 therebetween. The pseudo tape 46 is held between the capstan and the pinch roller of the cassette tape reproduction apparatus and fed out rightward in FIG. 1 with the rotation of the capstan. This motion of the pseudo tape 46 rotates the two left and right reels 24, 26 in the housing 120. The pseudo tape 46 is in contact with the anti-slide reel rubbers 22 arranged on the outer peripheral surface of the reels 24, 26, and therefore the two left and right reels 24, 26 rotate at substantially the same speed without sliding.

The three protrusions 24a, 26a formed inside of the reels 24, 26 are in mesh with the three notches 28a, 30a of the reel hubs 28, 30, respectively, so that the rotation of the reels 24, 26 applies a rotational torque to and rotates the reel hubs 28, 30. In this way, the driving force of the pseudo tape 46 is exerted on the reel hubs 28, 30 thereby to prevent the reel shafts of the speed under no load. Consequently, the cassette tape driving mechanism is not automatically stopped in a cassette tape reproduction apparatus including a sensor for detecting an abnormal rotation of the reel shafts.

As described above, in the cassette adaptor 1 mounted in the cassette tape reproduction apparatus, the signal from the portable compact disc reproduction apparatus is applied to the audio circuit of the electrical circuit board 70 through the plug and the cable connected to the output terminal (headphone terminal) of the compact disc reproduction apparatus. The signal input to the audio circuit is converted into the desired signal and applied to the magnetic head 58.

Figure 6:
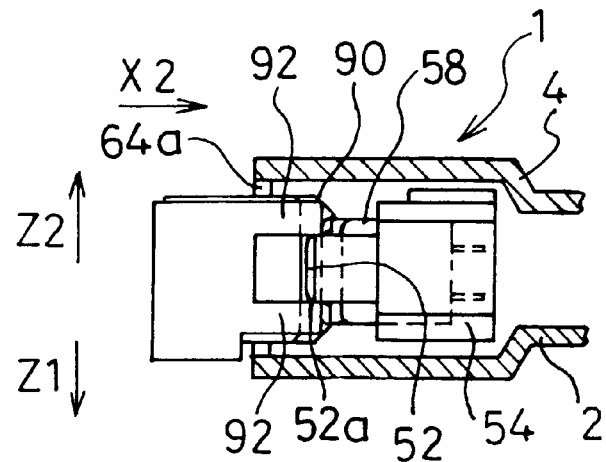
FIG. 6 is a diagram for explaining the state in which the magnetic head of the cassette adaptor according to the first embodiment and the reproduction head of the cassette tape reproduction apparatus are coupled with each other.
Figure 6:
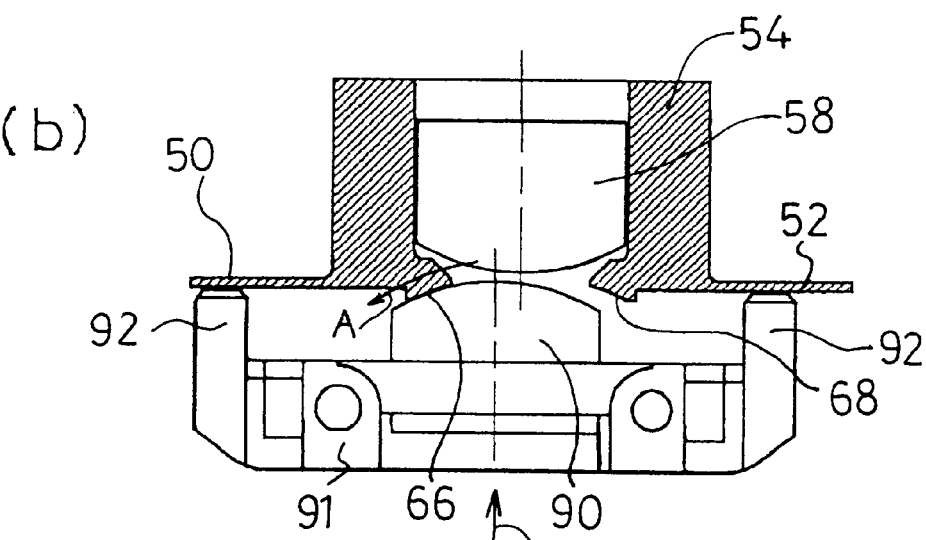
Figure 6:
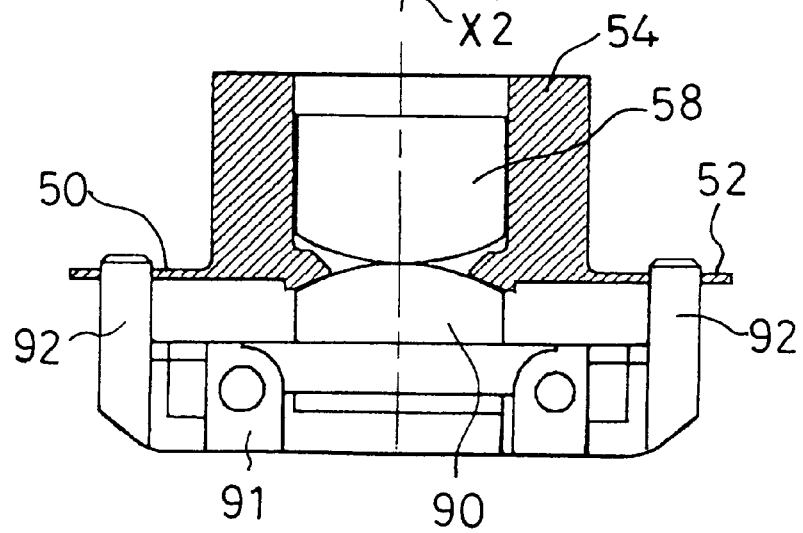

With reference to FIG. 6, explanation will be made about the operation of the cassette tape reproduction apparatus in reproduction mode with the cassette adaptor 1 mounted therein as described above. FIG. 6 is a diagram for explaining the state in which the magnetic head 58 and the reproduction head of the cassette tape reproduction apparatus are coupled with each other. (a) of FIG. 6 is a side sectional view showing the reproduction head 90 of the cassette tape reproduction apparatus inserted in the opening 64a of the cassette adaptor 1. As shown in (a) of FIG. 6, when the cassette tape reproduction apparatus is set in reproduction mode, the reproduction head 90 advances in the direction of arrow X2 in the opening 64a advances in the direction of arrow X2 in the opening 64a of the cassette adaptor 1. This advancing operation is inherently for causing the reproduction head 90 of the cassette reproduction apparatus to come into contact with the magnetic tape of the cassette tape inserted.

In the advancing operation of the reproduction head 90 described above, the tapered portions 50a, 52a of the dummy tape members 50, 52 engage with the tape guide 92 of the cassette tape reproduction apparatus so that the dummy tape members 50, 52 are guided to the desired position by the tape guide 92. If the magnetic head 58 and the reproduction head 90 are displaced from each other along the tape width (in vertical direction), the dummy tape members 50, 52 are moved by being guided by the tape guide 92, so that the magnetic head 58 and the reproduction head 90 are set at the same position along the tape width. Assume, for example, that the tape guide 92 is somewhat displaced upward (along the direction of Z2 in (a) of FIG. 6) of the dummy tape members 50, 52. The tape guide 92 will come into contact with the tapered portions 50a, 52a under the dummy taper members 50, 52, and the dummy tape members 50, 52 are moved upward. With the upward movement of the dummy tape members 50, 52, the magnetic head 58 also moves upward (in the direction Z2 in (a) of FIG. 6). As a result, the head cores 58a, 58b of the magnetic head 58 come to be located in opposed relationship with the head cores of the reproduction head 90.

While the head cover 54 having the magnetic head 58 is being moved to the desired position as described above, the upper surface of the head cover 54 is in a state urged in the direction of arrow Z1 in such a manner as to pressed against the back case 2 by the spring member 62d of the head spring 62 (FIG. 2). In the above-mentioned movement of the head cover 54, assume that the width of the dummy tape members 50, 52 is smaller than the width of the tape guide 92. Since the head cover 54 is kept pressed against the reference surface of the tape guide 92 by the spring member 62d of the head spring 62, the magnetic head 58 is held accurately in position relative to the reproduction head 90.

(b) of FIG. 6 is a plan view showing the case in which the centers of the reproduction head 90 and the magnetic head 58 are displaced from each other along the direction in which the tape runs. As shown in (b) of FIG. 6, when the center of the reproduction head 90 is displaced from the center of the magnetic head 58, the advance of the reproduction head 90 in the direction of arrow X2 causes the reproduction head 90 to come into contact with the head guide 66 constituting one of the two head guides formed on the front surface of the head cover 54. As the reproduction head 90 comes into contact with the head guide 66, the head cover 54 is subjected to the force in the direction along the radius of curvature of the front surface of the head guide 66 with respect to the reproduction head 90 (in the direction arrow A in (b) of FIG. 6). As a result, the head cover 54 for holding the magnetic head 58, as shown in (c) of FIG. 6, moves to a position where the central axis of the magnetic head 58 coincides with that of the reproduction head 90 along the tape running direction. (c) of FIG. 6 is a plan view showing the case in which the center of the reproduction head 90 coincides with that of the magnetic tape 58 along the tape running direction.

As described above, in the case where the cassette adaptor 1 according to the first embodiment is mounted in the cassette tape reproduction apparatus and the signal to be transmitted from the magnetic head 58 of the cassette adaptor 1 is applied to the reproduction head 90 of the cassette tape reproduction apparatus by a magnetic field, the dummy tape members 50, 52 provided on the front surface of the head cover 54 holding the magnetic head 58 are inserted into the tape guide 92 of the reproduction head 90, so that the magnetic head 58 is aligned with the reproduction head 90. In this way, as a result of engagement between the dummy tape members 50, 52 and the tape guide 90, the head cover 54 leads the magnetic head 58 to the right position with respect to the reproduction head 90 along the tape width. Also, as a result of the head guides 66, 68 being brought into contact with the reproduction head 90, the head cover 54 is led to the right position along the tape running direction. Consequently, the magnetic head 58 and the reproduction head 90 can be arranged at a position where the head cores thereof are nearest to each other without any displacement along either the tape width or the tape running direction.

According to the first embodiment, the head cover 54 having the magnetic head 58 is held movably by the head spring 62, and therefore the position thereof can be easily adjusted relative to the reproduction head 90 of the cassette tape reproduction apparatus, in which the cassette adaptor 1 is inserted.

Also, the head cover 54 having the magnetic head 58 according to the first embodiment is urged in such a direction as to be pressed against the back case 2 by the spring member 62d of the head spring 62. By forming an appropriate gap between the tape guide 92 of the reproduction head 90 and the dummy tape members 50, 52, therefore, the magnetic head 58 and the reproduction head 90 can be set in right relative positions. This takes advantage of the fact that the magnetic head 58 inserted into the cassette tape reproduction apparatus was set in position with reference to the lower end of the magnetic tape 58.

<<Second embodiment>>

Figure 7:
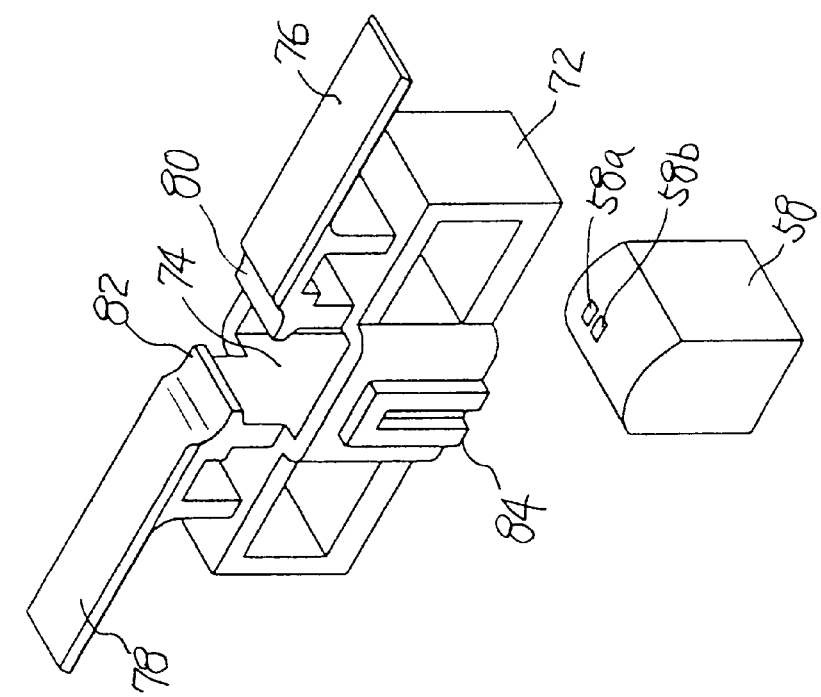
FIG. 7 is a perspective view (a) showing a head cover having a magnetic head of the cassette adaptor according to a second embodiment of the invention and an exploded perspective view (b) showing a head cover of a cassette adaptor according to a second embodiment of the present invention.
Figure 7:
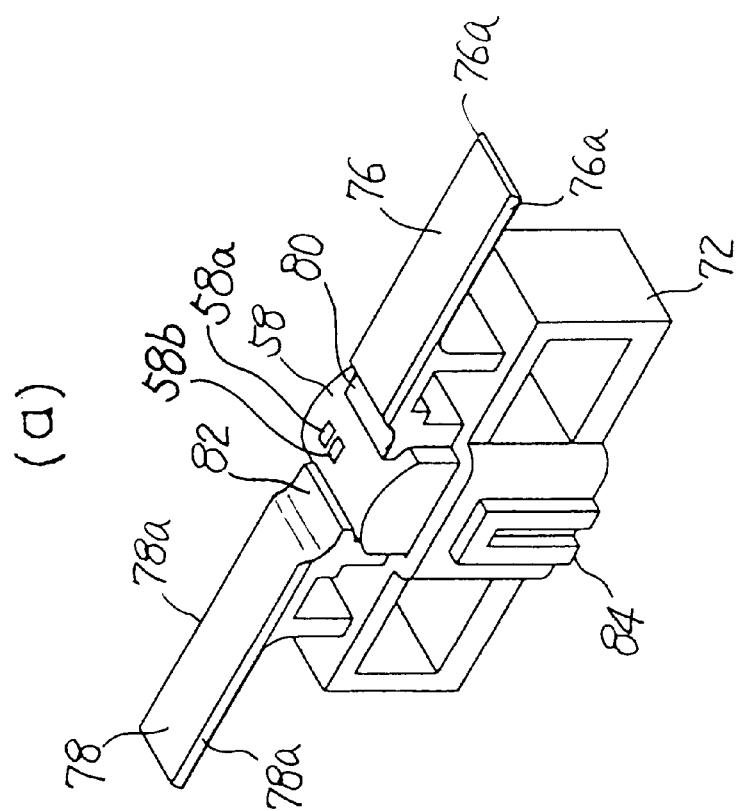

Now, a cassette adaptor according to a second embodiment of the present invention will be described with reference to the accompanying drawings. FIG. 7 is perspective views showing the configuration of the head cover of a cassette adaptor according to the second embodiment of the present invention. (a) of FIG. 7 is a perspective view showing the state before assembly, and (b) of FIG. 7 is an exploded perspective view showing the state after assembly. The cassette adaptor of the second embodiment, except for the head cover 72 describe later, has substantially the same configuration as the cassette adaptor according to the first embodiment described above. Those component parts of the second embodiment having the same function and structure as the corresponding parts of the first embodiment will be designated by the same reference numerals, respectively. Now, the component parts of the second embodiment different from the first embodiment will be explained.

As shown in (a) of FIG. 7, a space 74 for accommodating the magnetic head 58 is formed at the central portion of the head cover 72. This space 74 is formed in a size slightly larger than the magnetic head 58 at least along two front and rear directions.

The head cover 72 of the cassette adaptor according to the second embodiment, like in the above-mentioned first embodiment, is formed with dummy tape members 76, 78 at the two forward ends thereof. The upper and lower end surfaces of the dummy tape members 76, 78 are formed with tapered portions 76a, 78a to facilitate the insertion into the tape guide of the cassette tape reproduction apparatus. Ribs 80, 82 protruded toward each other are formed inside of the dummy tape members 76, 78. These ribs 80, 82 are for positioning the magnetic head 58 inserted from the back side of the head cover 72.

The head cover 72 according to the second embodiment has, on the upper side thereof, a head spring guide 84 for guiding the spring member 62d (see FIG. 2) of the head spring 62. In the cassette adaptor of the second embodiment except for the head cover 72 described above, the cassette adaptor uses the same component elements as those of the cassette adaptor of the first embodiment. Therefore, the same component elements will not be described below.

Now, explanation will be made about a method of assembling the head cover 72 according to the second embodiment configured as described above.

The magnetic head 58 is inserted into the space 74 of the head cover 72 shown in (a) of FIG. 7 from the back side thereof and brought into contact with the inner surfaces of the ribs 80, 82. The magnetic head 58 thus is set in position along the longitudinal direction. Then, the magnetic head 58 is set in position with respect to the dummy tape members 76, 78. In the process, the magnetic head 58 is accurately set in position in such a manner that the head cores 58a, 28b of the magnetic head 58 are located in opposed spaced relation to each other as predetermined on the extension of the dummy tape members 76, 78. After thus setting the magnetic head 58 in position, the magnetic head 58 is fixed by inserting an adhesive agent in the gap between the walls of the space 74 and the magnetic head 58 arranged in the space 74. For fixing the magnetic head 58 and the head cover 72 to each other, a well-known fixing technique can be used. In this fixing technique, adequate time is taken for fixing. For example, after first fixing them partially with an instantaneous adhesive agent, the remaining portion of the gap is filled with a two-part adhesive agent.

The head cover 72 assembled in this manner can be used in place of the head cover 54 according to the first embodiment described above, and is mounted with the head spring guide 84 up so that the head spring guide 84 is arranged at up side.

Figure 8:
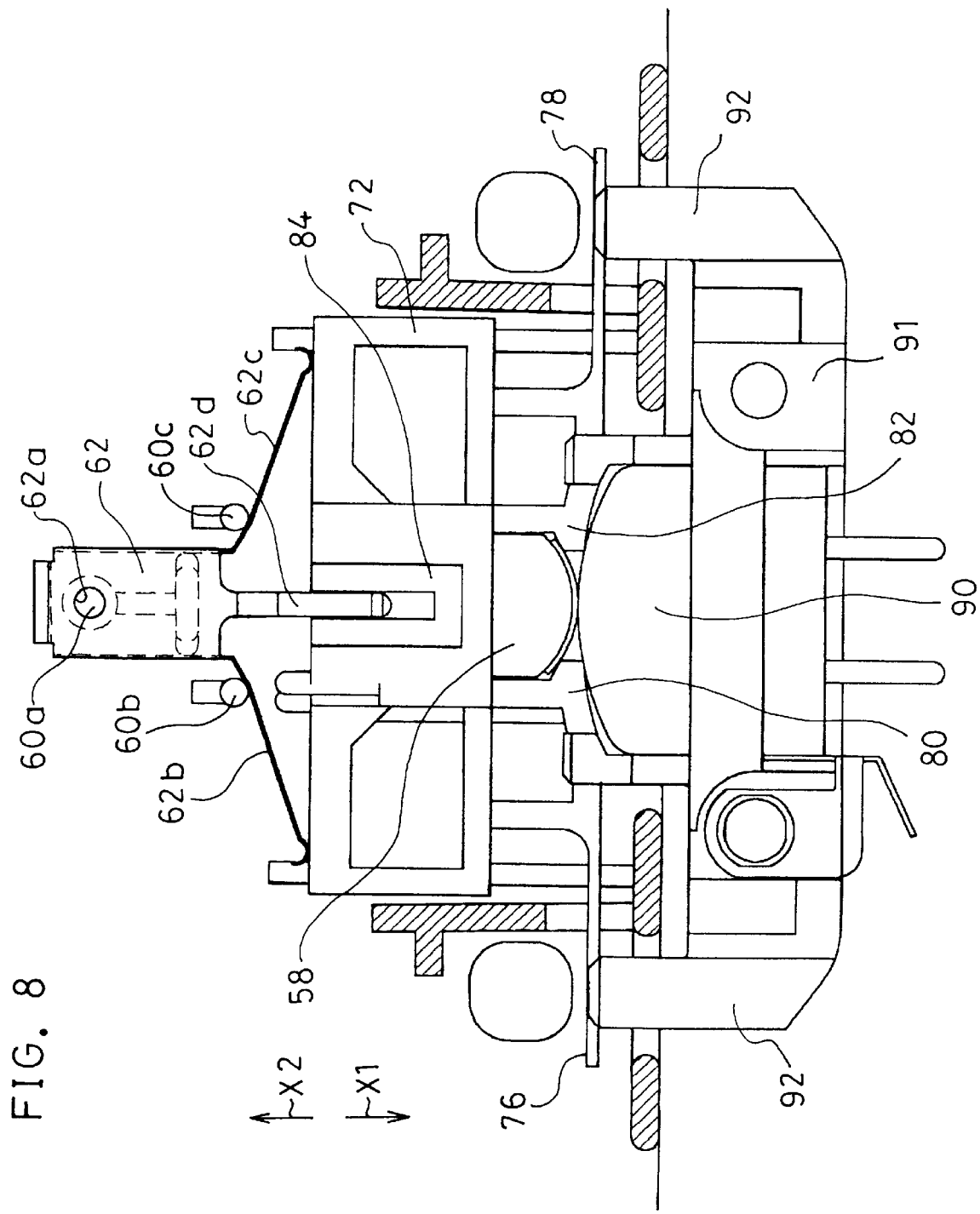
FIG. 8 is a plan view showing the state in which the magnetic head of the cassette adaptor according to the second embodiment and the reproduction head of a cassette tape reproduction apparatus are coupled with each other.

FIG. 8 is a plan view showing the state in which the head cover 72 according to the second embodiment is mounted on the cassette adaptor. In FIG. 8, the spring member 62d of the head spring 62 is inserted in the groove of the head spring guide 84, and the head cover 72 is urged in such a direction as to be pressed against the back case 2 by the spring member 62d.

Also, as in the first embodiment described above, according as the reproduction head 90 of the cassette tape reproduction apparatus with the cassette adaptor mounted thereon advances into the cassette adaptor while the reproduction head 90 is in reproduction mode, the tape guide 92 formed integrally with the support member 91 of the reproduction head 90 engages the dummy tape members 76, 78 thereby to lead the head cover 72 to the desired position.

With the cassette adaptor according to the second embodiment configured as described above, the operation of the cassette adaptor mounted in the cassette tape reproduction apparatus is similar to the first embodiment described above. Consequently, the operation is performed in a manner similar to the case in which the dummy tape members 76, 78 according to the second embodiment have replaced the dummy tape members 50, 52 shown in (b) of FIG. 6 according to the first embodiment. As a result, the magnetic head 58 is arranged relative to the reproduction head 90 along tape running direction as shown in FIG. 8. When the reproduction head 90 comes into contact with any of the front surfaces of the left and right ribs 80, 82, as in the case shown in (b) of FIG. 6 described above, the head cover 72 moves in such a manner that the center line of the magnetic head 58 coincides with that of the reproduction head 90.

In the cassette adaptor according to the second embodiment, the spring member 64d of the head spring 62 in mesh with the head spring guide 84 is formed with such a small width as to be capable of being displaced in lateral directions. For this reason, the lateral movement of the head cover 72 can be followed by the bending of the spring member 64d. Also, as shown in FIG. 8, the head cover 72 is held elastically and slidably in the directions longitudinal of the housing (in the directions of arrows X1 and X2 in FIG. 8) by the spring members 62b, 62c of the head spring 62. Therefore, the head cover 72 is moved by contact with the reproduction head 90 which has advanced in, so that the magnetic head 58 is arranged at the desired position relative to the reproduction head 90.

As described above, according to the second embodiment, the cassette adaptor can be obtained whose magnetic head 58 in the assembly process can be easily set in position with respect to the head cover 72 by the ribs 80, 82, and whose position is automatically adjusted with respect to the reproduction head 90 of the magnetic head 58 at the time of reproduction operation.

<<Third embodiment>>

Figure 9:
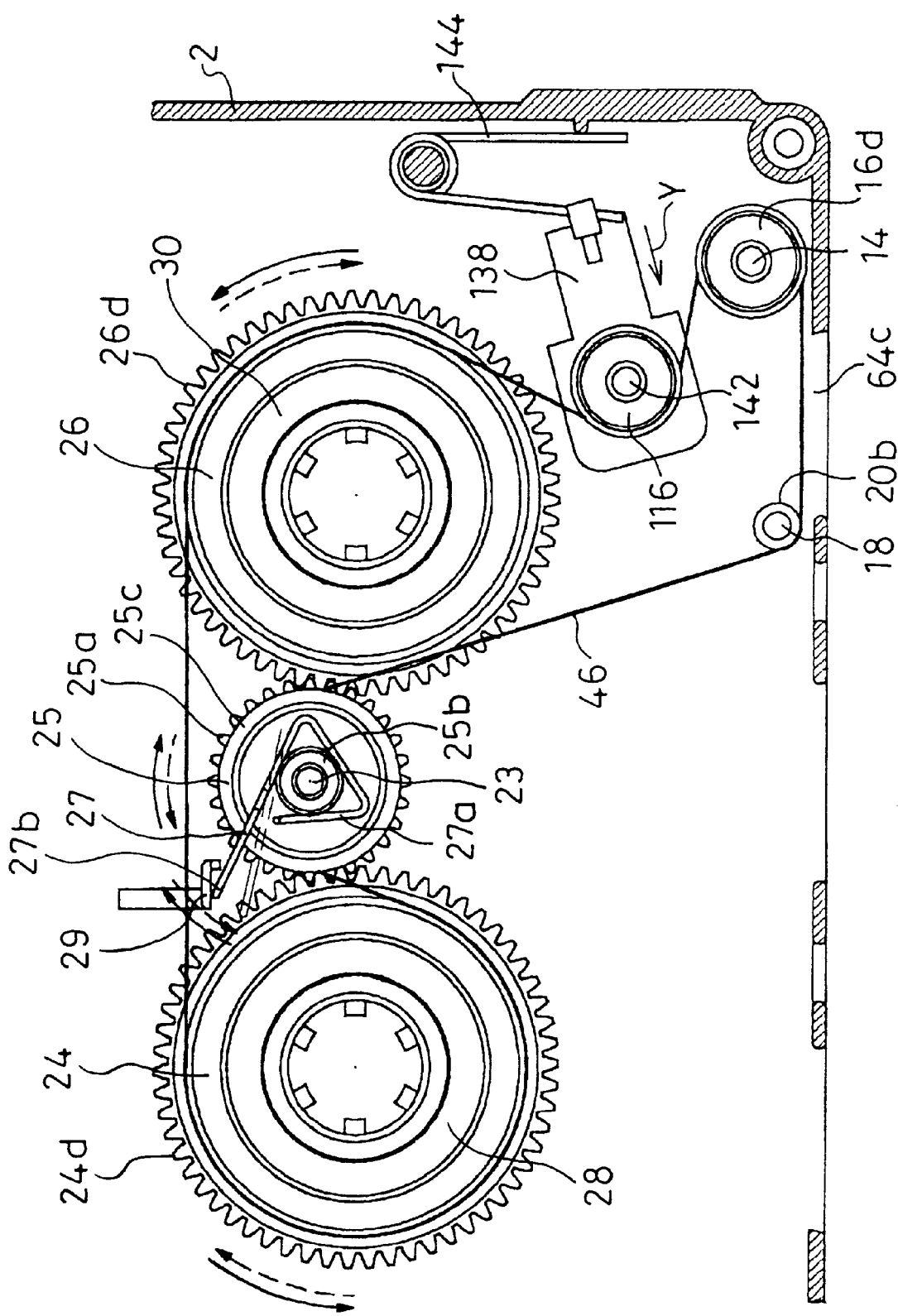
FIG. 9 is a plan view showing a drive mechanism for reels of a cassette adaptor according to a third embodiment of the present invention.

Now, a cassette adaptor according to a third embodiment of the present invention will be described with reference to the accompanying drawings. Those component parts having substantially the same function and structure as the corresponding ones of the cassette adaptor according to the first and second embodiments described above will be designated by the same reference numerals, respectively, and will not be further described. FIG. 9 is a plan view showing a driving mechanism of the reels 24, 26 of the cassette adaptor according to the third embodiment. In FIG. 9, the component elements other than the driving mechanism, which are not shown, have substantially the same configuration as those of the cassette adaptor according to the first and second embodiments described above.

As shown in FIG. 9, the cassette adaptor according to the third embodiment includes the reels 24, 26 formed with gear teeth 24d, 26d, respectively. An intermediate reel 25 having gear teeth 25a in mesh with the gear teeth 24d, 26d is interposed between the two reels 24, 26.

An endless pseudo tape 46 is suspended over the left and right reels 24, 26, and the intermediate reel 25, etc.

As shown in FIG. 9, the pseudo tape 46 is suspended counterclockwise on the outer periphery of the left reel 24, suspended clockwise on the outer periphery of the intermediate reel 25 and then suspended counterclockwise on the outer periphery of each of the rollers 20b, 16d.

The pseudo tape 46 is also suspended clockwise on the tension roller 116 arranged between the roller 16d and the right reel 26, suspended counterclockwise on the outer periphery of the right reel 26, and then returns to the left reel 24. The pseudo tape 46 is given the tension by a tension roller 116 interposed between the roller 16d and the right reel 26.

The roller 116 is rotatably and pivotally supported on a pin 142 arranged on a tension lever 138. The tension lever 138 is urged in the direction of arrow Y in FIG. 9 by a tension spring 144. As a result, the pseudo tape 46 is given the tension by the urging force of the tension spring 144. According to the third embodiment, therefore, there is not any mechanism such as the roller 16d, the tension lever 38 or the tension spring 44 used in the above-mentioned first embodiment for giving tension to the pseudo tape 46. Also, the third embodiment is not provided with the rollers 16a, 16b and 20a.

The intermediate reel 25 having the gear teeth 25a, which is in mesh with the gear teeth 24d, 26d of the reels 24, 26, is configured to rotate in synchronism with the reels 24, 26. The gear ratio between the teeth are set in such a manner as to secure a coincident peripheral speed along the outer peripheral surfaces on which the pseudo tape 46 is suspended. As a result, the reels 24, 26 on which the endless pseudo tape 46 is suspended rotate at the same peripheral speed as the corresponding parts of the cassette adaptor according to the above-mentioned first embodiment. Thus, the pseudo tape 46 does not slide over the outer peripheral surfaces of the reels 24, 26, so that the reels 24, 26 accurately rotate with the movement of the pseudo tape 46. Also, according to the third embodiment, as in the above-mentioned first embodiment, reel rubbers 22 (see FIG. 3) are provided for preventing the sliding between the pseudo tape 46 and the reels.

Figure 10:
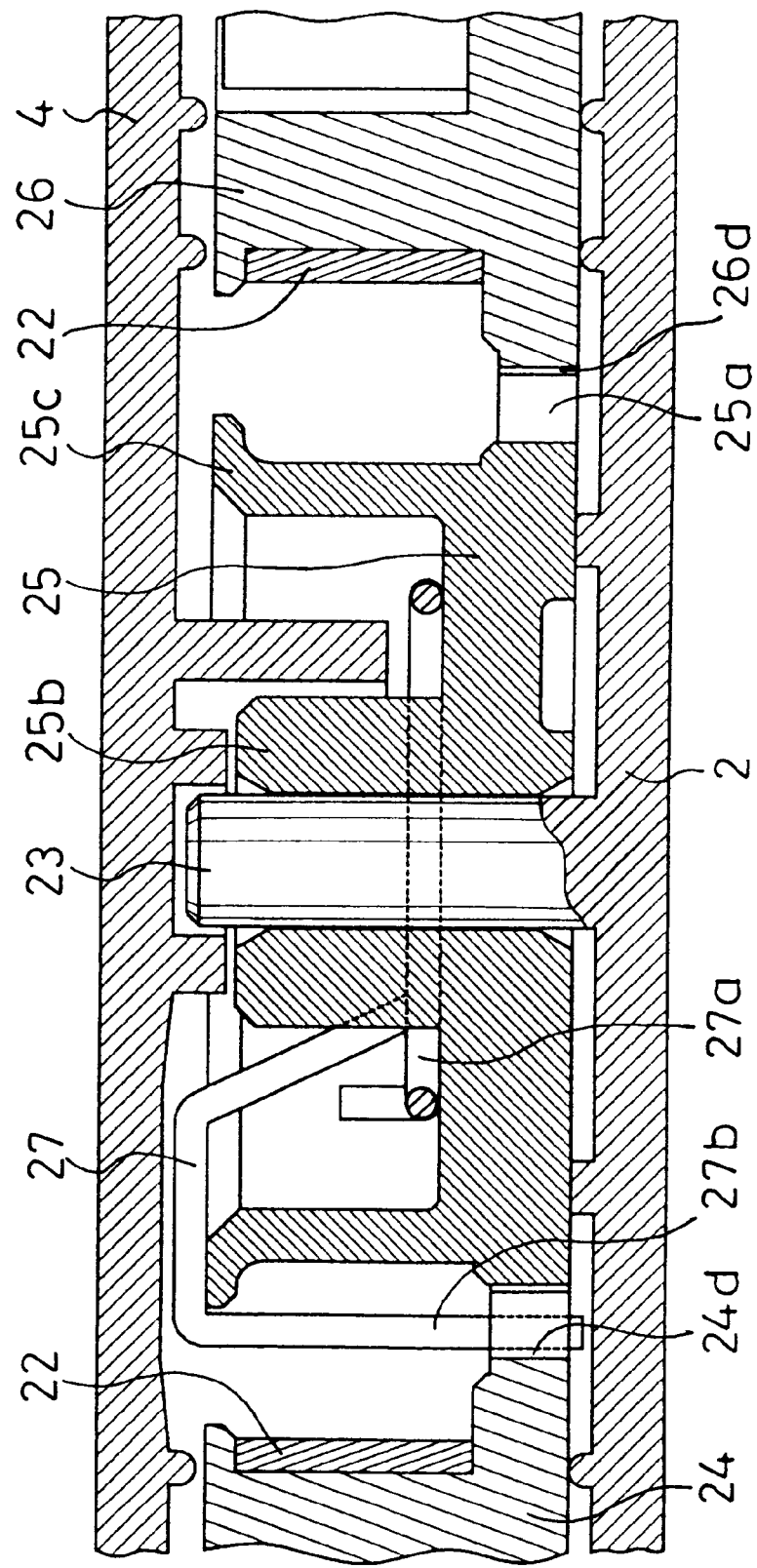
FIG. 10 is a sectional view showing the neighborhood of an intermediate reel according to the third embodiment.

FIG. 10 is a sectional view showing the neighborhood of the intermediate reel 25 according to the third embodiment. As shown in FIG. 10, the intermediate reel 25 having the gear teeth 25a in mesh with the gear teeth 24d, 26d of the reels 24, 26, respectively, is rotatably and pivotally supported on the pin 23 formed on the back case 2. The intermediate reel 25 is formed with a hub 25b having a central hole inserted with a pin 23 and a side wall section 25c surrounding the hub 25b.

This intermediate reel 25 includes a stopper member 27 for preventing reverse rotation. The stopper member 27 for preventing reverse rotation is for preventing the reverse rotation of the left and right reels 24, 26 and is provided for rotating the reels 24, 26 only in the same direction. As shown in FIG. 9, the stopper member 27 for preventing the reverse rotation has an end thereof formed with a holder section 27a bent in a triangular form. This holder section 27a is pressure-fitted in the hub section 25b of the intermediate reel 25. A forward end contact section 27b formed over the side wall section 25c of the intermediate reel 25 is formed at the other end of the stopper member 27 for preventing the reverse rotation. This forward end contact section 27b is configured to move within a movable range between the position engageable with the gear teeth 24d of the left reel 24 and the position contactable with the stopper 29.

The stopper member 27 for preventing the reverse rotation arranged as mentioned above is mounted on the hub section 25b of the intermediate reel 25 in such a way as to rotate together with the intermediate reel 25 within the above-mentioned movable range. The stopper member 27, however, has the holder section 27a thereof for holding the hub section 25b so that the holder section 27a slides with the hub section 25b of the intermediate reel 25 in the case that the stopper member 27 is subjected to a force larger than a predetermined rotational torque in the direction opposite to the rotation of the intermediate reel 25. Consequently, with the clockwise rotation of the intermediate reel 25 in FIG. 9, the forward contact portion 27b of the stopper member 27 comes into contact with the stopper 29 with the result that the holder section 27a of the stopper member 27 slides over the hub section 25b of the intermediate reel 25. Conversely, the counterclockwise rotation of the intermediate reel 25 in FIG. 9 causes the forward contact section 27b of the stopper member 27 to engage the gear teeth 24d of the left reel 24, thus inhibiting the rotation of the left reel 24.

[Operation of stopper member for preventing reverse rotation]

Now, the operation of the above-mentioned stopper member 27 will be described in detail.

Figure 11:
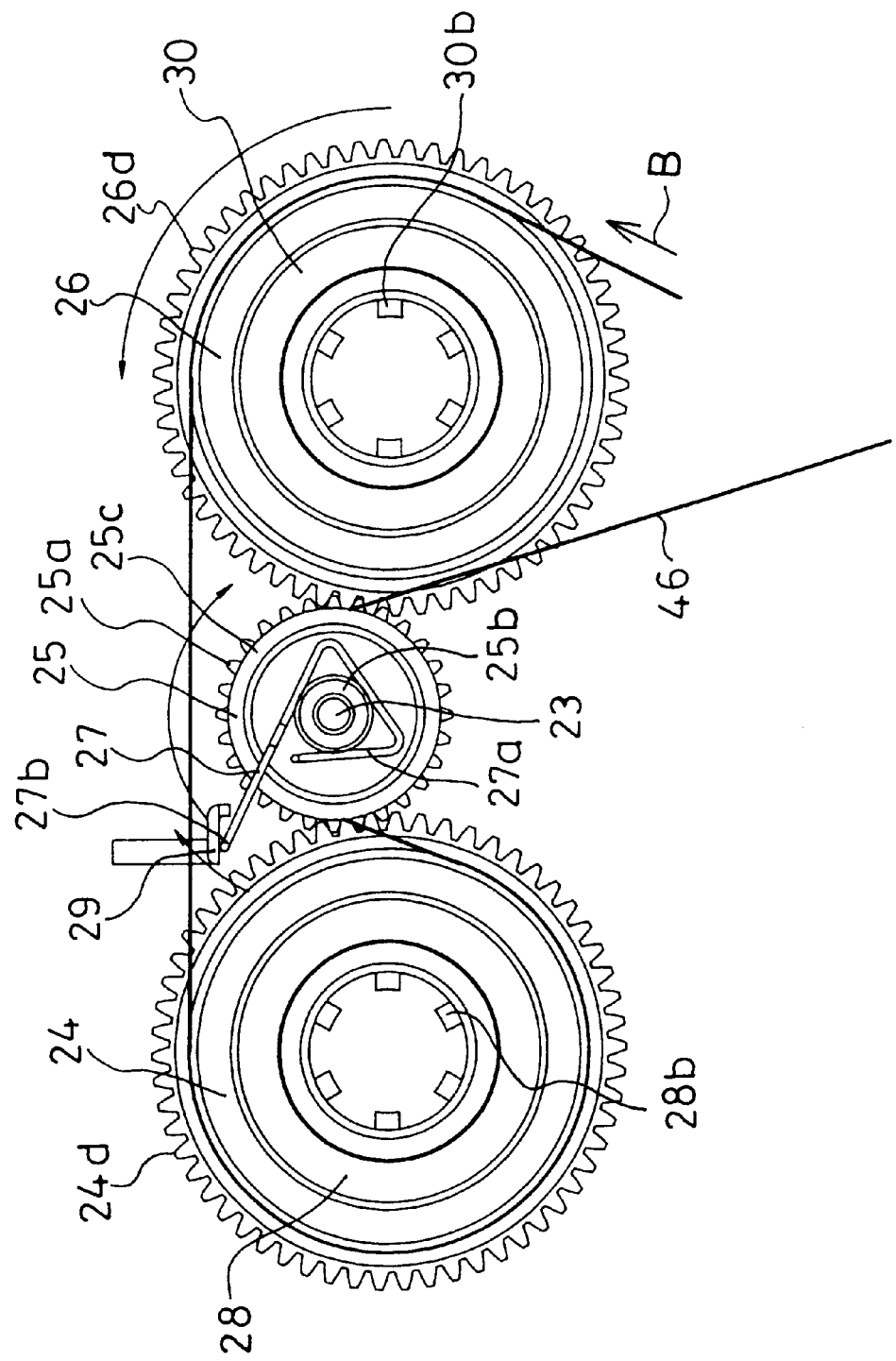
FIG. 11 is a plan view showing the operation in forward direction of the reels and the intermediate reel of a cassette adaptor according to the third embodiment.
Figure 12:
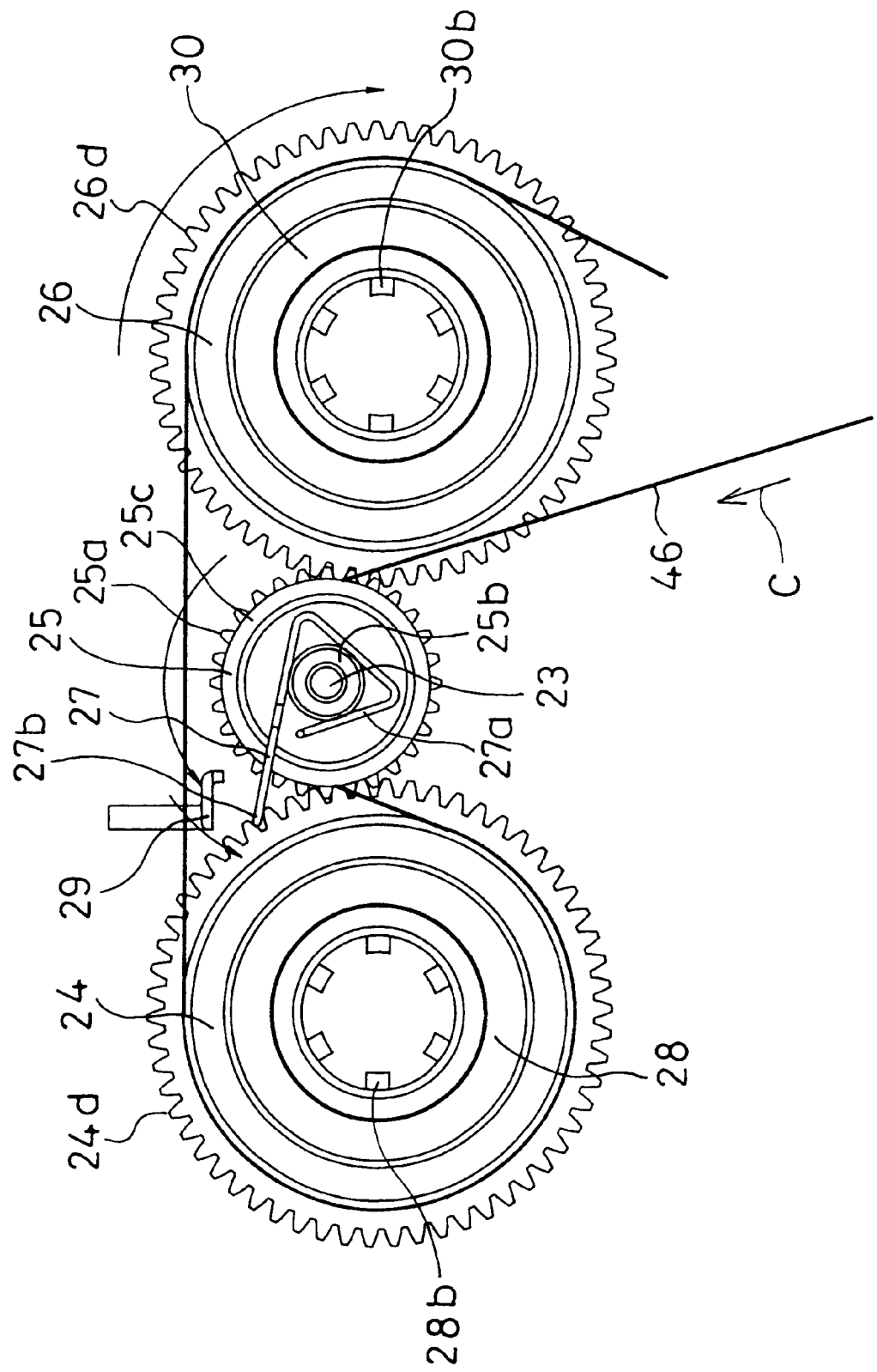
FIG. 12 is a plan view showing the operation in reverse direction of the reels and the intermediate reel of a cassette adaptor according to the third embodiment.

FIGS. 11 and 12 are plan views showing the operation of the reels 24, 26 and the intermediate reel 25 of the cassette adaptor according to the third embodiment configured as described above. FIGS. 11 and 12 show only the main component elements for explaining the operation of the reels 24, 26 and the intermediate reel 25.

The endless pseudo tape 46 shown in FIG. 11 is running in the direction of arrow B. As a result, the right reel 26 and the left reel 24 are rotated in counterclockwise direction, while the intermediate reel 25 rotates in clockwise direction. At the same time, the gear teeth 24d, 26d of the reels 24, 26 engage with the gear teeth 25a of the intermediate reel 25, so that the reels 24, 26 rotate at the same peripheral speed as the intermediate reel 25. While the intermediate reel 25 is rotating clockwise in this way, the stopper member 27 rotates clockwise under the friction force with the hub section 25b of the intermediate reel 25. The forward contact portion 27b of the stopper member 27, however, comes into contact with the stopper 29 forming one end of the movable range and stops rotating in clockwise direction. Even after the stopper 29 stops rotating, the intermediate reel 25 continues to rotate under the driving force of a predetermined rotational torque, and therefore the intermediate reel 25 continues the rotating operation without generating any noises. Thus, a slide is caused between the hub section 25b of the intermediate reel 25 and the holder section 27a of the stopper member 27, with the result that the intermediate reel 25 continues to rotate clockwise in accordance with the feed of the pseudo tape 46. This operating condition is shown in FIG. 11.

As described above, though the holder section 27a of the stopper member 27 is pressure-fitted in the hub section 25b of the intermediate reel 25, the holder section 27a is mounted in such a manner that when a constant or more rotational torque is applied to the stopper member 27, the holder section 27a slides with the hub section 25b under the particular force.

The constant rotational torque by which the intermediate reel 25 is driven is defined as a rotational torque generated by a driving force for feeding the pseudo tape 46 while being held between the capstan and the pinch roller of the cassette tape reproduction apparatus. And the constant rotational torque capable of sliding the stopper member 27 with the intermediate reel 25 while the forward end contact portion 27b of the stopper member 27 is in contact with the stopper 29. The rotational torque of the intermediate reel 25 is determined by the friction force between the pseudo tape 46 and the reels 24, 26 on the one hand, the pseudo tape 46 and the intermediate reel 25 on the other, and is sufficient if it has a force enough to rotate both the stopper member 27 and the intermediate reel 25 in the movable range of the stopper member 27.

The endless pseudo tape 46 shown in FIG. 12 is running in the direction of arrow C. As a result, the right reel 26 and the left reel 24 are rotated clockwise, while the intermediate reel 25 rotates counterclockwise. In the process, the gear teeth 24d, 26d of the reels 24, 26 are in mesh with the gear teeth 25a of the intermediate reel 25, so that the reels 24, 26 and the intermediate reel 25 are rotating at the same peripheral speed. When the intermediate reel 25 is rotating counterclockwise in this way, the stopper member 27 is rotated counterclockwise under the friction force with the hub section 25b of the intermediate reel 25. As a result, the forward contact portion 27b of the stopper member 27 comes into contact with the gear teeth 24d of the left reel 24 constituting one of the ends of the movable range. Since the gear teeth 24d of the reel 24 are rotating clockwise, the forward end contact portion 27b and the gear teeth 24d act in such a direction as to bite each other. Consequently, the clockwise rotation of the left reel 24 is inhibited while stopping and the counterclockwise rotation of the intermediate reel 25. At the same time, the rotation of the right reel 26 is also stopped through the gear teeth 25a of the intermediate reel 25. The state in which the rotation is stopped this way is shown in FIG. 12.

[Operation of cassette adaptor]

Now, explanation will be made about the operation in the case where a cassette adaptor according to the third embodiment configured as described above is mounted in a cassette tape reproduction apparatus having an auto reverse mechanism. The description that follows concerns the case in which a signal to be transmitted from the magnetic head 58 having two tracks is transmitted to the reproduction head of the cassette tape reproduction apparatus by the magnetic field.

First, as shown in FIG. 11, explanation will be made about the operation in which the reels 24, 26 rotate in forward direction (counterclockwise direction in FIG. 11). With this operation in forward rotational direction, the head core of the magnetic head 58 is on the same track, i.e., at the same position as the head core of the reproduction head having the reproduction function. In this case, the pseudo tape 46 of the cassette adaptor is adapted to run in the direction of arrow B in FIG. 11, and the intermediate reel 25 rotates clockwise as described above. The intermediate reel 25 thus continues to rotate in accordance with the feed of the pseudo tape 46. Also, the two reels 24, 26 continue to rotate in counterclockwise direction in interlocked relation with each other.

Consequently, the signal to be transmitted from the magnetic head 58 for signal transmission can be continuously transmitted toward the reproduction head of the cassette tape reproduction apparatus.

On the other hand, when the reels 24, 26 are rotating in the reverse direction (the clockwise direction in FIG. 12), the head core of the magnetic head 58 is not located on the same track as the head core of the reproduction head having the reproduction function. In such a case, the pseudo tape 46 is running in the direction of arrow C in FIG. 12, and as described above, the intermediate reel 25 rotates in counterclockwise direction and the resulting engagement between the stopper member 27 and the gear teeth 24d inhibits the rotation of the reels 24, 26. Thus, the same judgement is made as if the auto reverse mechanism of the cassette tape reproduction apparatus has detected a tape end, thereby switching the tape in the forward running direction. As a consequence of this switching operation, the head core position of the magnetic head 58 and the position of the head core of the reproduction head having the reproduction function coincide with each other on the same track. Thus, the pseudo tape 46 runs in the direction of arrow B in FIG. 11, and therefore the intermediate reel 25 continues to rotate in the clockwise direction in accordance with the feed of the pseudo tape 46. As a result, the signal from the signal-transmission magnetic head 58 is transmitted to the reproduction head of the cassette tape reproduction apparatus by the magnetic field.

On the other hand, also in the case that the cassette adaptor according to the third embodiment is mounted reversely in the cassette tape reproduction apparatus, as in the operation shown in FIG. 12 described above, the auto reverse mechanism operates in such a manner that the position of the head cores of the magnetic head 58 may coincide with the position of the head cores of the reproduction head. In the cassette tape according to the third embodiment, therefore, it is possible to avoid the problem of the conventional cassette adaptor that the signal cannot be transmitted and the reproduction becomes impossible when the cassette adaptor is reversely mounted.

As described above, in the case that the cassette adaptor according to the third embodiment is mounted in the cassette tape reproduction apparatus having an auto reverse mechanism and the head cores of the reproduction head at such positions that the signal cannot be transmitted from the magnetic head 58, the reel rotation is inhibited thereby to reverse the direction of tape feed. Also, in the case that the signal can be transmitted to the reproduction head of the cassette tape reproduction apparatus from the signal-output magnetic head 58 for outputting the signal when the cassette adaptor according to the third embodiment is mounted in the cassette tape reproduction apparatus, the reels continue to rotate thereby reproducing the signal from the cassette adaptor. As a result, the cassette adaptor according to the third embodiment, even so configured to use a magnetic head with two tracks, can meet the requirements of the cassette tape reproduction apparatus having an auto reverse mechanism.

<<Fourth embodiment>>

Next, a cassette adaptor according to a fourth embodiment of the present invention will be described.

In the first or second embodiment described above, the reel rubber 22 (FIG. 3) is arranged on the contact surface of the reels 24, 26 in contact with the pseudo tape. In the cassette adaptor according to the fourth embodiment, the endless pseudo tape is formed of a material of high friction coefficient for an improved friction coefficient between the reels and the pseudo tape without using the reel rubber. Consequently, the reels positively rotate without sliding by the feeding operation of the pseudo tape.

Figure 13:
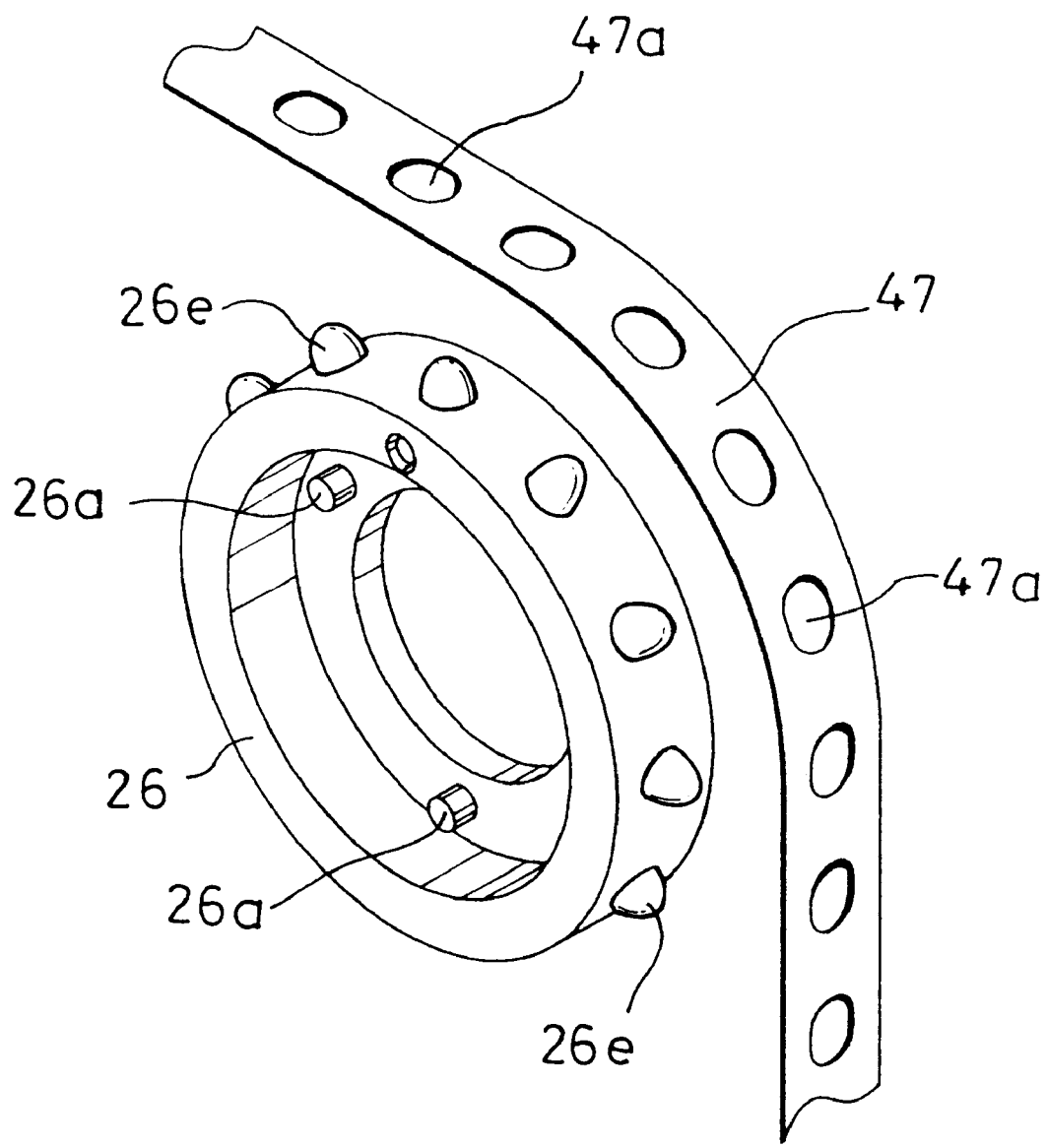
FIG. 13 is a perspective view showing a right reel and a pseudo tape of a cassette adaptor according to a fourth embodiment of the present invention.
Figure 14:
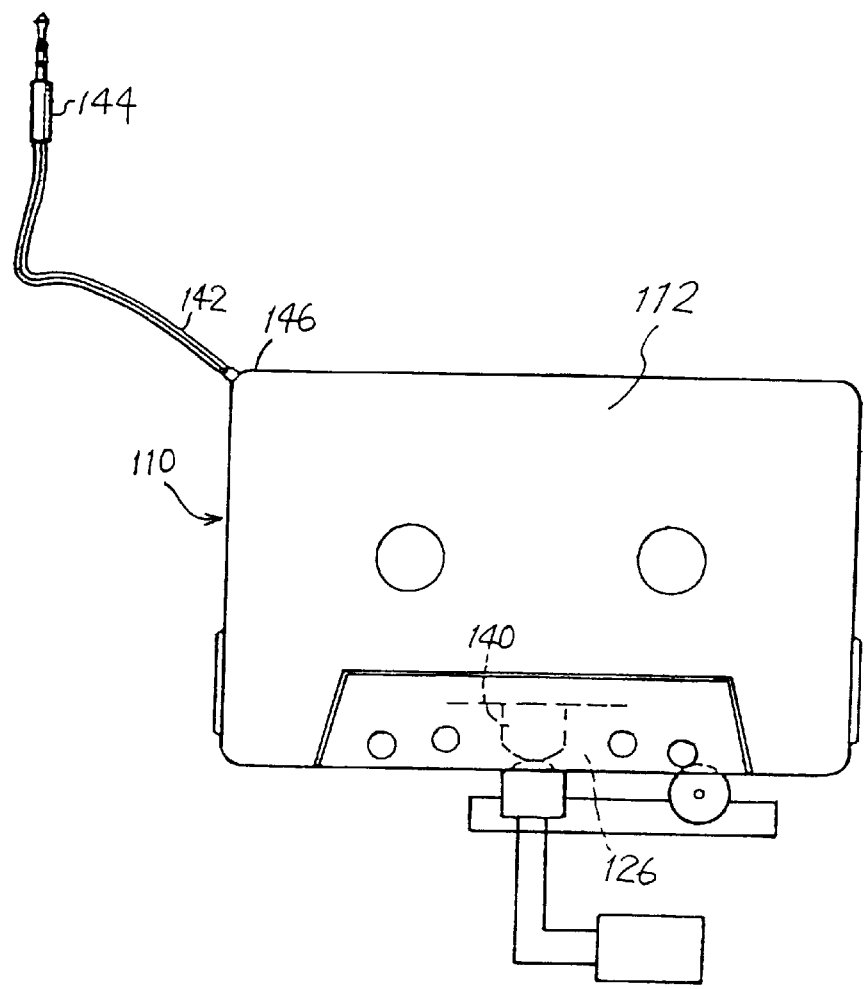
FIG. 14 is the plan view showing the conventional cassette adaptor.
Figure 15:
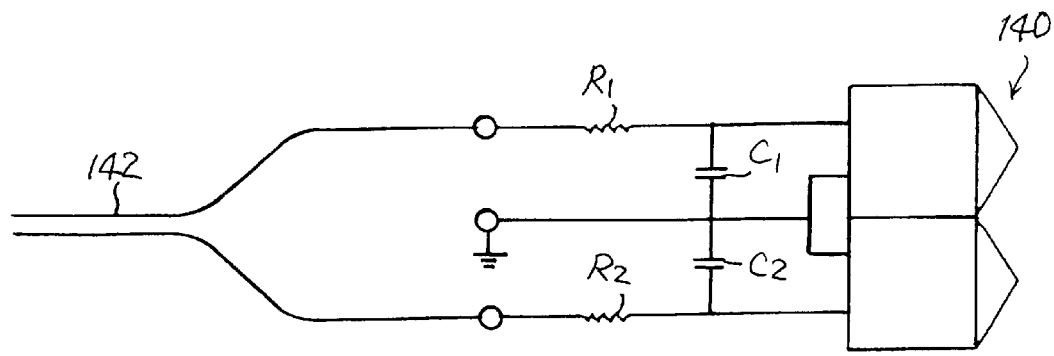
FIG. 15 is the electrical circuit diagram of the conventional cassette adaptor.

A specific pseudo tape having a high friction coefficient will be described below with reference to the accompanying diagram of FIG. 13. Those component parts having substantially the same function and structure as the corresponding ones of the cassette adaptors according to the first, second and third embodiments described above will be designated by the same reference numerals, respectively, and will not be described any further. FIG. 13 is a perspective view showing the right reel 26 and the pseudo tape 47 of the cassette adaptor according to the fourth embodiment. In FIG. 13, the configuration of other than the shown parts is substantially identical to that of the cassette adaptor according to the first, second and third embodiments described above.

As shown in FIG. 13, a plurality of substantially conical protrusions 26e are arranged equidistantly along the outer periphery of the reel 26. Although only the right reel 26 is illustrated in FIG. 13, similar conical protrusions are equidistantly arranged also along the outer periphery of the left reel. The endless pseudo tape 47 suspended on the outer periphery of the reel 26 is formed with a multiplicity of perforation holes 47a equidistantly each at intervals equal to the distance between the centers of the protrusions 26e. Thus, the perforation holes 47a of the endless pseudo tape 47 accurately engage the protrusions 26e of the reel 26, so that the feeding operation of the pseudo tape 47 positively rotates the reel 26. In the cassette adaptor according to the fourth embodiment configured as mentioned above, the sliding between the tape and the reels can be prevented with reliability.

According to the fourth embodiment, the perforation holes 47a are preferably formed in an ellipsoid to assure that the pseudo tape 47 engages the protrusions 26e of the reels 24, 26 even if the intervals of a plurality of the protrusions 26e are somewhat different from the intervals of a plurality of the perforation holes 47a.

The reel 26 having the protrusions 26e and the pseudo tape 47 formed with the perforation holes 47a according to the fourth embodiment can be used with and can be operated in a similar manner to the cassette adaptors according to the first, second and third embodiments described above.

The cassette adaptor according to each of the above-mentioned embodiments represents an example of the present invention. The cassette adaptor according to the present invention, therefore, can be variously modified and is not confined to the illustrated embodiments in terms of the shape or quantity of the parts, for example.

The component parts included in the first to the fourth embodiments can be appropriately combined to constitute a cassette adaptor according to the present invention.

Although a compact cassette tape and the equipment using it were explained in each of the embodiments described above, the present invention is not limited to such a compact cassette tape but is equally applicable to other cassette tapes and the equipment using the same.

Also, the source of the signals applied to the cassette adaptor according to the present invention is not limited to the compact disc reproduction apparatus but can be any equipment capable of generating an audio signal.

In the above-mentioned embodiments, the stopper means for preventing the reverse rotation configured of an intermediate reel, a stopper member, a stopper, etc. is used as a means for preventing the reverse rotation of the reels. A similar effect can be exhibited, however, by providing a unidirectional clutch included in the support member of the housing for supporting the reels rotatably.

As described above, in the cassette adaptor according to the present invention, a head cover having a magnetic head is elastically held by a head spring, and therefore when the cassette adaptor is mounted in the cassette tape reproduction apparatus, the magnetic head can be easily moved in accordance with the position of the reproduction head.

In view of the fact that the head cover of the cassette adaptor according to the present invention is pressed in one direction by the head spring (for example, in such a direction as to press the head cover against the back cover), the signal-output magnetic head can be set in position with respect to the reference surface of the tape guide.

The head cover of the cassette adaptor according to the present invention is formed to have a head guide. The signal-output magnetic head, therefore, can be arranged in an accurate position along the tape running direction with respect to the reproduction head of the cassette tape reproduction apparatus. As a result, the magnetic head is positively arranged at a position of a high transmission efficiency with respect to the reproduction head, thereby preventing crosstalks from being generated.

With the cassette adaptor according to the present invention, the head cover includes ribs for positioning the magnetic head, and therefore the magnetic head can be easily incorporated in the head cover. At the same time, the head cover is formed with a head spring guide to hold the head cover elastically along the tape running direction, thereby making it possible to adjust the position of the magnetic head relative to the reproduction head with high accuracy.

In the cassette adaptor according to the present invention, dummy tape members are formed on the head cover having the magnetic head. When the cassette adaptor is mounted in the cassette tape reproduction apparatus, therefore, the dummy tape members of the cassette adaptor are inserted in and guided by the tape guide of the cassette tape reproduction apparatus. The signal-output magnetic apparatus thus is arranged in accurate position along the tape width with respect to the reproduction head of the cassette tape reproduction apparatus.

The endless pseudo tape of the cassette adaptor according to the present invention is driven at a substantially constant speed by the capstan and the pinch roller of the cassette tape reproduction apparatus, and the reels on which the pseudo tape is suspended rotate without slide. Accordingly, it is possible to avoid an erroneous judgement by the cassette tape reproduction apparatus with the cassette adaptor mounted therein that the tape has broken. The cassette adaptor thus is not automatically stopped or automatically discharged by an erroneous operation.

The cassette adaptor according to the present invention includes means for preventing the reverse rotation. In the case where this cassette adaptor is mounted in a cassette tape reproduction apparatus having an auto reverse mechanism with the signal-output magnetic head being at a position incapable of transmitting a signal to the reproduction head of the cassette tape reproduction apparatus, therefore, the reel rotation is automatically inhibited and the tape running direction is reversed. Thus the signal-output magnetic head can be rearranged at a position capable of transmitting a signal to the reproduction head of the cassette tape reproduction apparatus.

With the cassette adaptor according to the present invention, a plurality of protrusions are formed on the outer peripheral surface of the reels and the endless pseudo tape is formed with a plurality of perforation holes adapted to engage the protrusions. As a result, the reels are positively rotated with the feed of the pseudo tape, thereby positively preventing the sliding between the tape and the reels.

The present invention was described above in some detail with reference to preferred embodiments. The disclosed contents of these preferred embodiments can of course be modified in the detailed configuration thereof, and the combination and the sequence of the component elements thereof can be modified without departing from the scope and spirit of the invention claimed below.

What is claimed is:

1. A cassette adaptor comprising:
   a housing having a shape mountable interchangeably with a cassette tape reproduced in a cassette tape reproduction apparatus;
   a magnetic head for outputting a signal, which is built in said housing, and arranged to face a reproduction head of said cassette tape reproduction apparatus for reproducing said cassette tape, so as to transmit a signal to said reproduction head; and
   a head cover for accommodating and holding said magnetic head in a predetermined positional relationship with said housing, and said head cover including at least a dummy tape member adapted to engage a tape guide of said cassette tape reproduction apparatus for guiding said magnetic head to a position facing said reproduction head.

2. A cassette adaptor according to claim 1, further comprising a head spring for supporting said head cover elastically with respect to said housing, urging said magnetic head in a direction to contact the reproduction head inserted in said housing, and urging said head cover in such a manner that said dummy tape member comes into contact with a reference surface of the tape guide of said cassette tape reproduction apparatus.

3. A cassette adaptor according to claim 1, further comprising a head guide formed to face said reproduction head of said cassette tape reproduction apparatus in said head cover for contacting the reproduction head inserted in said housing and guiding said magnetic head to a predetermined position.

4. A cassette adaptor according to claim 1, wherein said head cover includes at least a rib formed to face said reproduction head of said cassette tape reproduction apparatus for contacting and setting said magnetic head in position at the time of assembling said magnetic head.

* * * * *